United States Patent
McKay et al.

(10) Patent No.: US 6,313,822 B1
(45) Date of Patent: *Nov. 6, 2001

(54) METHOD AND APPARATUS FOR MODIFYING SCREEN RESOLUTION BASED ON AVAILABLE MEMORY

(75) Inventors: Micheale Rathbun McKay, Shoreline; Donald Brian Moore, Renton; Mark A. Champion, Seattle, all of WA (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,822

(22) Filed: Mar. 27, 1998

(51) Int. Cl.[7] ........................................... G09G 5/00
(52) U.S. Cl. .................. 345/132; 345/127; 345/115; 345/116; 345/342; 345/545
(58) Field of Search ..................... 345/127, 115, 345/116, 131, 132, 211, 213, 342, 345, 545

(56) References Cited

U.S. PATENT DOCUMENTS

| | | | |
|---|---|---|---|
| 5,485,279 | 1/1996 | Yonemitsu et al. . | |
| 5,500,654 | * 3/1996 | Fujimoto | 345/123 |
| 5,532,716 | * 7/1996 | Sano | 345/132 |
| 5,539,873 | 7/1996 | Yoshimori et al. . | |
| 5,600,347 | * 2/1997 | Thompson et al. | 345/127 |
| 5,612,715 | * 3/1997 | Karaki et al. | 345/132 |
| 5,736,971 | * 4/1998 | Shirai | 345/127 |
| 5,742,272 | * 4/1998 | Kitamura et al. | 345/127 |
| 5,818,417 | * 10/1998 | Mattison | 345/132 |
| 5,880,728 | * 3/1999 | Yamaashi et al. | 345/343 |
| 5,945,974 | * 8/1999 | Sharma et al. | 345/115 |

* cited by examiner

Primary Examiner—Almis R. Jankus
Assistant Examiner—Henry N. Tran
(74) Attorney, Agent, or Firm—Blakely, Sokoloff, Taylor & Zafman

(57) ABSTRACT

A method and apparatus for modifying screen resolution based on available memory identifies a first screen resolution for a display. Then, a second screen resolution for at least a portion of the display is created, wherein the creating is based on the first screen resolution and an amount of memory to be used for the at least a portion of the display.

52 Claims, 13 Drawing Sheets

METHOD AND APPARATUS FOR MODIFYING SCREEN RESOLUTION BASED ON AVAILABLE MEMORY

BACKGROUND OF THE INVENTION

1. Field of the Invention

The present invention pertains to video processing. More particularly, this invention relates to modifying screen resolutions.

2. Background

The display of video images has become extremely important in the modern world, including typical computer uses, such as multimedia games and video conferencing, as well as other entertainment uses, such as movies. Modern computers, as well as other commercially available devices, typically include the ability to display video images, many of which allow display of real-time motion video. Examples of such systems include display devices designed for use with typical computer systems.

One problem encountered in many systems is the amount of memory required to display video images. Mass storage devices, such as CD-ROMs, digital video disks (DVDs) and hard disk drives are relatively inexpensive. However, the process of displaying video images typically requires transfer of these images from the mass storage device (or other source) to a more expensive random access memory (RAM), typically referred to as a frame buffer. The RAM used as the frame buffer is often video RAM (VRAM), which is particularly suited to displaying video, but which is also very expensive. The amount of VRAM within a system can often noticeably affect the overall system price. Thus, it would be beneficial to provide a way to reduce the amount of VRAM necessary for video images.

Additionally, modern computer systems typically provide users with the ability to alter screen resolution and color resolution for their display devices. The screen resolution refers to the number of pixels displayed by the display device, while the color resolution refers to the number of different colors which each pixel can have. Larger screen and color resolutions provide for more realistic video images, but also require additional memory, including VRAM, for storage and display. Thus, it would be beneficial to provide a way to reduce the amount of memory used for video images without significantly reducing the image quality.

Thus, a need exists for a method and apparatus for modifying screen resolution based on available memory.

SUMMARY OF THE INVENTION

A method and apparatus for modifying screen resolution based on available memory is described herein. According to the present invention, a first screen resolution for a display is first identified. Then, a second screen resolution for at least a portion of the display is created, wherein the creating is based on the first screen resolution and an amount of memory to be used for the at least a portion of the display.

According to one embodiment, the first screen resolution corresponds to a video signal received from a computer system while the second screen resolution corresponds to a motion video signal received from a remote video conferencing camera. In this embodiment, the second screen resolution is determined based on the amount of frame buffer memory available for the display of the motion video signal. Also, the motion video signal is overlaid on the video signal received from the computer system, allowing both images to be displayed concurrently despite the differing screen resolutions.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
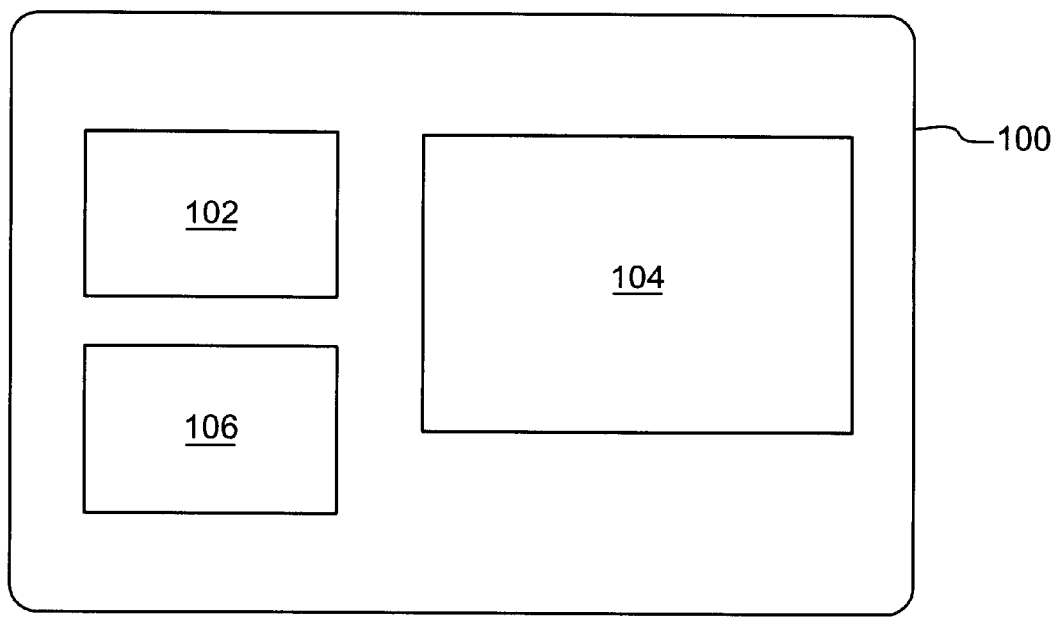
FIG. 1 illustrates a display of a video multiplexing system according to one embodiment of the present invention.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating"

or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Definitions

"Color space" is used herein to mean a representation of a set of colors. Typical color spaces include RGB, YIQ, YUV and YCrCb.

"Computer video" and "computer video signal" are used herein to mean an analog RGB video signal or signals generated by any computer or similar hardware device. Further, such term as used herein includes both "video content" as well as format and timing information that is separate from the "video content".

"Far side image" is used herein to mean the motion video image sent from a remote site or sites participating in a video conferencing session.

"Group clock" or "GCLK" is used herein to mean a derivative of the "synthesized pixel clock". According to one embodiment, the GCLK is the "pixel clock" divided by four.

"Horizontal total" or "$H_{total}$" is used herein to mean the number of pixel groups contained in a single horizontal scan line. $H_{total}$ is the sum, as measured in pixel groups, of the horizontal pulse sync width, the horizontal back porch ("$H_{back\ porch}$") the horizontal active time, and the horizontal front porch ("$H_{front\ porch}$").

"Motion video signal" is used in the illustrated embodiment to mean the "video signal" originating in the video conferencing system outside of the computer via a video camera, VCR, television, etc. However, as discussed in more detail below, the zooming of the present invention can use any video signal.

"Multiplexing" is used herein to mean the act of combining separate sub-images each of which may have differing "video envelopes".

"Near side image" is used herein to mean the motion video image generated by a local camera in a video conferencing environment. It is optionally displayed on the local screen.

"Pixel clock" is used herein to mean the periodic digital clock associated with the "computer video signal" or other "video signal" from which all components of the "video signal" are referenced. It is preferably a high frequency signal, the rate of which defines when the pixels are updated as well as how many pixels are on a horizontal scan line. A derivative of the "pixel clock" known as "group clock" is used to create the horizontal sync component of the "video envelope" of the computer video signal. "Original pixel clock" is used herein to mean the pixel clock of the source of the "video signal", while "synthesized pixel clock" is used herein to mean that pixel clock generated by a phase-locked loop which is iteratively adjusted so that it tracks, but is not necessarily equal to, the "original pixel clock".

"Pixel group" is used herein to mean four pixels, although it will be understood that in other embodiments, a different number may instead be used.

"Video content" or "video information" is used herein to mean a temporal and spatial dependent stream of data representing, in the illustrated embodiment, Red, Green and Blue components of an image, the latter of which may be either static or dynamic. "Video content" may be separated from the "video envelope" in the "video signal" for the purpose of compression, encoding, or other image processing purposes. For example, "video content" could be separated from its "video envelope" and multiplexed with another "video signal" for a picture-in-picture (PIP) effect.

"Video envelope" is used herein to mean a composition of signal components with specific timing relationships used to convey a video image between two points. Signal components typically include horizontal sync and vertical sync. "Video content" is inserted into the "video envelope" to result in a complete "video signal". If no "video content" is inserted into the "video envelope", the resulting "video signal" appears as a solid black image when viewed on a display device.

"Video signal" is used herein to mean a composite signal containing "video content" within a "video envelope".

Overview of the Video Multiplexing System

FIG. 1 illustrates a display of a video multiplexing system. A display 100 is illustrated which includes windows 102, 104, and 106. Such windows may be generated by a video conferencing application, such as the local and remote windows, or by any of a wide variety of other applications, such as a game or other application. It should be noted that virtually any number of windows can be displayed on the display 100, and that a window could be enlarged to be full screen (that is, encompass the entire display).

The display 100 has an associated screen and color resolution. The screen resolution refers to the number of pixels which are displayed on the screen and the color resolution refers to the number of different colors which each pixel can be. Conventional display devices typically support a wide range of screen and color resolutions. Although a large number of screen resolutions exist, typical screen resolutions include 640×480 (307,200 pixels), 800× 600 (480,000 pixels), 1024×768 (786,432 pixels), 1280× 1024 (1,310,720 pixels), and 1600×1200 (1,920,000 pixels). Similarly, although a large number of color resolutions exist, typical color resolutions include 8-bit (256 colors), 16-bit (65,536 colors), 24-bit (16,777,216 colors), and 32-bit (4,294,967,296 colors).

The amount of storage space required for an image can be calculated by multiplying the number of pixels by the color resolution. By way of example, 1024×768 screen resolution and 16-bit color resolution requires 1,572,864 bytes, which equals 1.5 Megabytes (MB).

Figure 2:
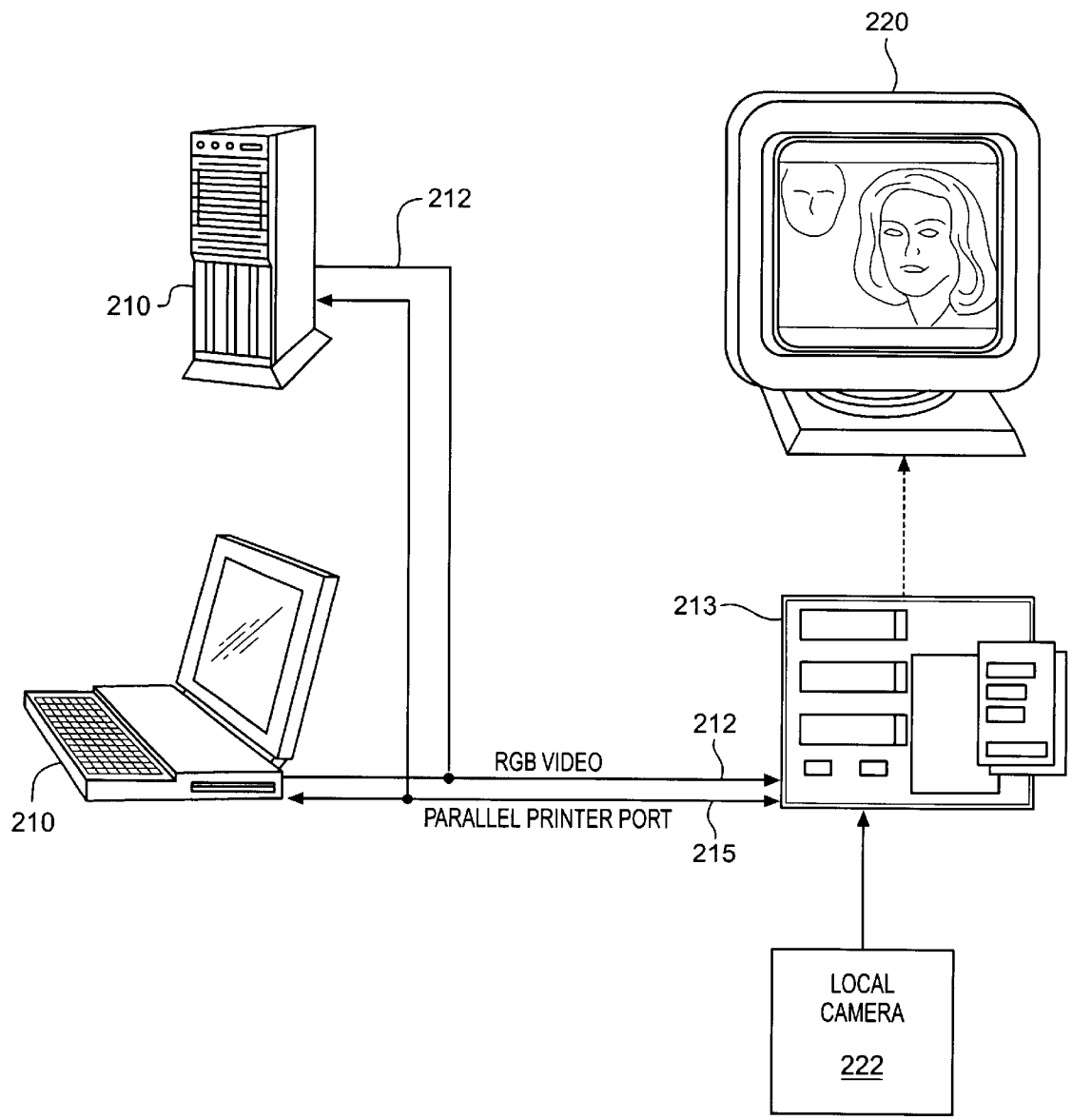
FIG. 2 illustrates a video multiplexing system according to one embodiment of the present invention.

FIG. 2 illustrates a video multiplexing system according to one embodiment of the present invention. A computer 210 as illustrated can be any of a wide variety of general purpose computers, such as a desktop PC, laptop PC, or a network PC-like device. Computer 210 provides an RGB analog computer video signal 212 (including image, timing and format information) to the multiplexing system 213 of the present invention. An additional data and control path 215 is established, such as by coupling the computer's parallel port to the video multiplexing system 213. This data and control path 215 is used to send messages to and from the computer 210 and the video multiplexing system 213. Alternatively, other uni-directional and/or bi-directional ports, such as a serial port, Universal Serial Bus (USB) port, other IEEE 1394-compliant ports, etc., may be used for the data and control path 215.

The video multiplexing system 213 combines the computer video signal 212 generated from the computer 210 with incoming video signals from a local camera 222 and from a remote camera (not shown), and provides the resulting output on a monitor 220. A composite image which combines the images from the computer 210, the video from the remote camera, and the video from the local camera 222 is then output from the video multiplexing system 213 for display on the monitor 220, and the image from the local camera 222 is sent to a video conferencing encoder (part of system 213) where it is appropriately encoded before transmission to the remote system.

Configuration and Operation of the Video Multiplexing System

Figure 3:
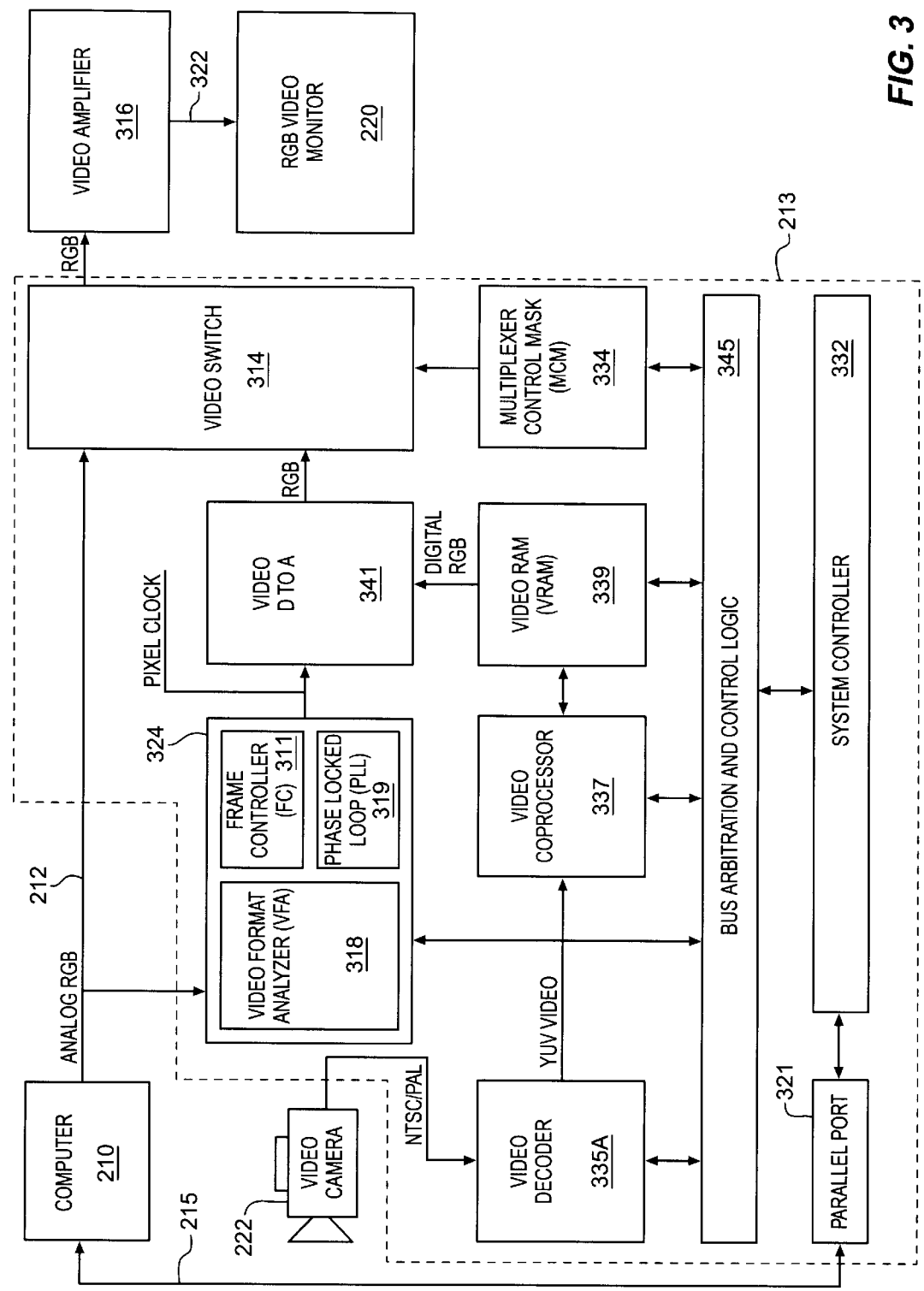
FIGS. 3, 4, and 5 are a more detailed illustration of the a video multiplexing system of FIG. 2 according to one embodiment of the present invention.
Figure 4:
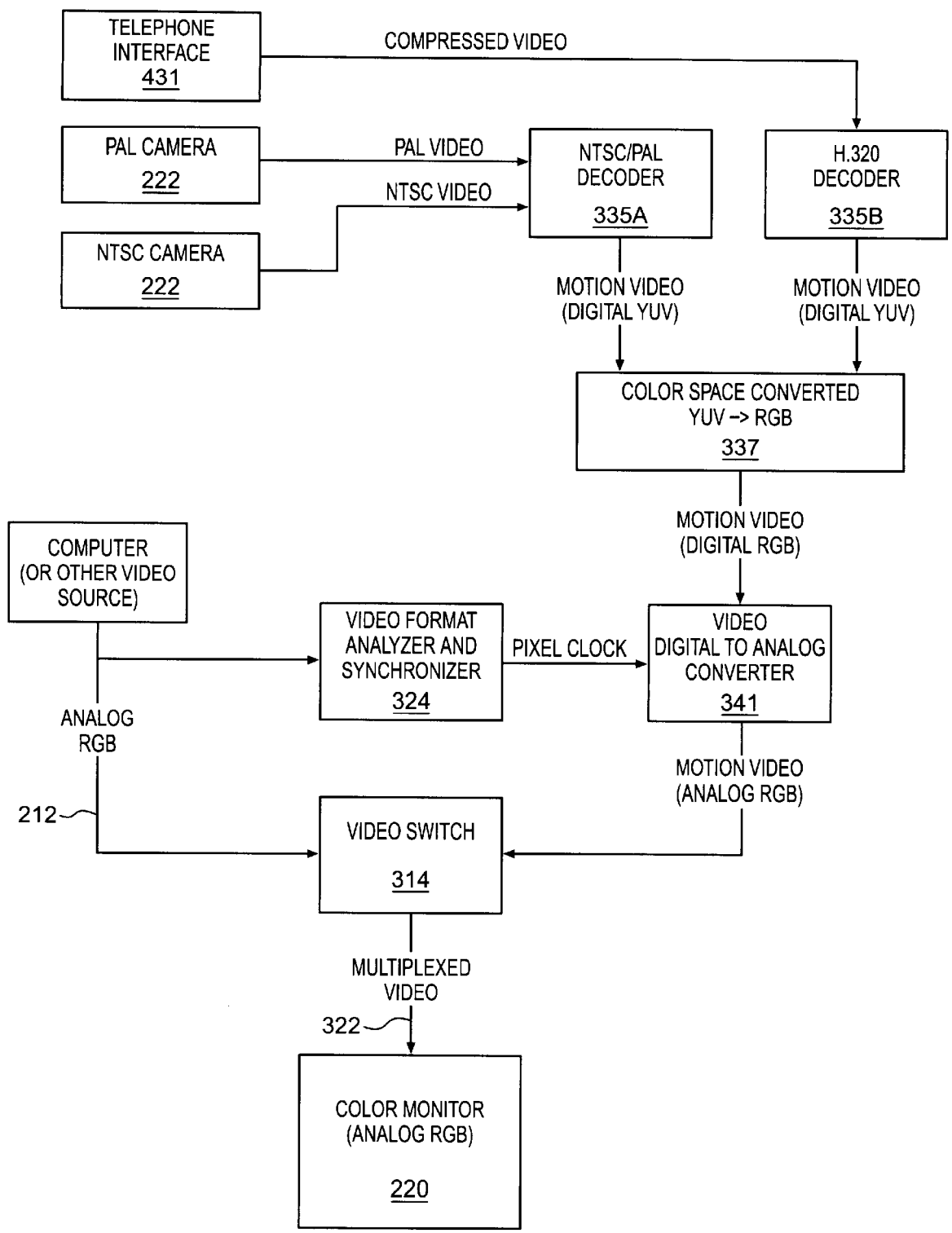
Figure 5:
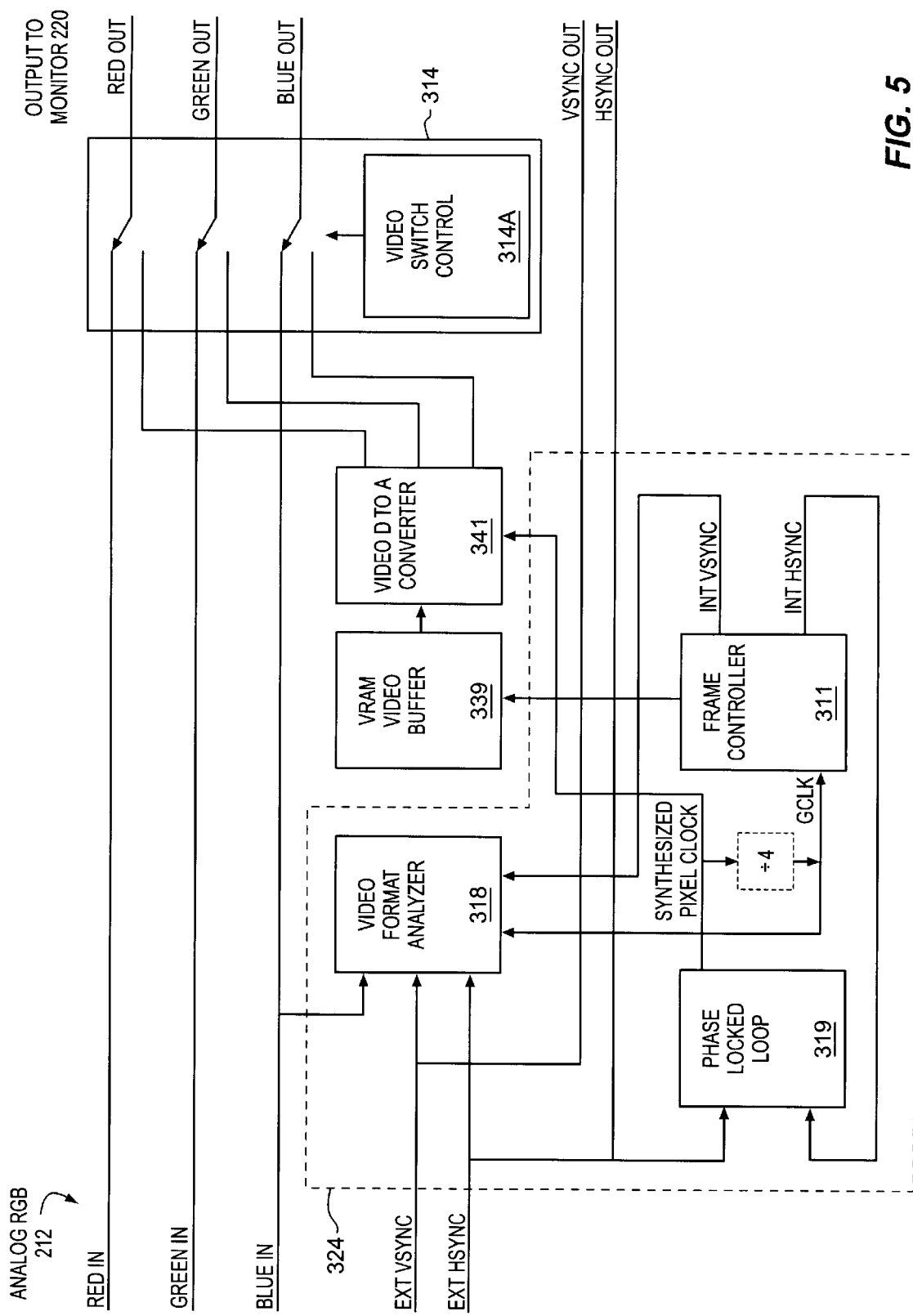

FIGS. 3, 4, and 5 illustrate a video multiplexing system according to one embodiment of the present invention. During operation, the computer video signal 212 can pass directly through the video multiplexing system 213 to the video amplifier 316 and the monitor 220. Thus, the video multiplexing system passes the computer video signal 212 without modification. Alternatively, the computer video signal 212 may be combined, in real-time, with video generated from a second video source(s). According to one embodiment, wherein the multiplexing system of the present invention is used in a video conferencing environment, the second video source(s) is a local camera 222 and/or a remote camera. Thus, the motion video signals generated from the local and/or remote cameras should operate within the same timing and format as the computer video graphics generated by the computer 210. Accordingly, in one embodiment the incoming motion video signals are converted to analog RGB signals in order to match the color space of the computer video and the monitor 220, and the timing parameters of the computer video signal 212, including horizontal and vertical sync and active video time, are analyzed in order to synchronize the motion video signals with the computer video signal 212. The multiplexing system 213 accomplishes this in a manner described in more detail below.

I. Motion Video processing

According to one embodiment of the present invention, the motion video is provided from a local camera 222 (near-side video images) and a remote video camera (far-side video images), both of which operate according to defined NTSC, PAL or other such standards for video, including receipt of compressed video via a telephone interface 431. In order to combine the motion video directly with the video signal 212 from the computer 210, the video information contained in the NTSC/PAL-formatted or compressed motion video signal is converted to an analog RGB format. Thus, the motion video, including video images and other information, generated by both the local video source and the remote video source is captured and converted by video converter 335*a* or 335*b* to a 4:2:2 YUV formatted data stream. If the motion video is either NTSC or PAL formatted, it is provided to an NTSC/PAL decoder 335*a*. However, if compressed video is received via a telephone interface 431 then it is instead decoded in an H.320 decoder 335*b*. The conversion process of decoders 335*a* and 335*b* is well known to those skilled in the art, and thus will not be discussed further except as it pertains to the present invention.

The formatted data is output from decoders 335*a* and 335*b* and placed into a VRAM frame buffer 339 by the video co-processor 337. VRAM 339 is preferably a 2 MB VRAM. The video co-processor 337 converts and scales the YUV data to digital RGB by reading out the data from the VRAM 339, processing the data to convert same to digital RGB data, and writing the thus digitized RGB data back into the VRAM 339. The video co-processor 337 scales the YUV data in its received format, a 352×288 resolution image in the illustrated video conferencing system, to the appropriate RGB screen resolution (e.g., 1280×1024) and to the window size in which the motion video is to be displayed through a process well-known to those skilled in the art. Thus, the co-processor 337 is also referred to as a "scaler" or "scaling engine". The co-processor 337 includes multiple user-accessible registers (not shown) which can be set with the appropriate window size. The co-processor 337 calculates, using interpolation, additional pixel values for the image and/or eliminates pixels from the image in accordance with the window size. According to one embodiment, the video co-processor 337 is a Weitck Video Power co-processor Model No. 9130-PFD. However, in alternate embodiments similar co-processors as known to those skilled in the art are substituted.

The digital information is then converted to an analog RGB signal by a video digital to analog (D/A) converter 341 before it is forwarded to the video switch 314. As illustrated in FIG. 3, the entire foregoing process is accomplished under the control of a system controller 332 through bus arbitration and control logic 345. According to one embodiment, the controller 332 is a digital signal processor (DSP) Model No. 320C80 available from Texas Instruments of Dallas, Tex. Similarly, the video D/A converter 341 is a D/A converter Model No. TVP3026, also available from Texas Instruments. However, in alternate embodiments similar DSPs and/or D/A converters as known to those skilled in the art are substituted.

Once the motion video signal(s) is thus converted, it is now ready to be directly combined in the switch 314 with the computer video signal 212 from the computer 210. However, before the motion video signals (local and remote) and computer video signal 212 are combined, the signals are synchronized. Synchronization of these signals will now be discussed.

II. Synchronization of the Motion Video and Computer Video Signals

As discussed above, the present invention can be adapted for use with almost any computer system, including a variety of display types/formats (e.g., any of the standard VESA video formats). In effecting synchronization (in format and timing) of the motion video signal and the computer video signal, the format of the incoming computer video signal is initially unknown, and thus the vertical and horizontal parameters of such signal are unknown. As set forth above, such horizontal and vertical parameters are determined in order to synchronize the motion video signal and the computer video signal.

In order to synchronize the motion video signal with a computer video signal of an unknown format, it is important that the signals' vertical sync ($V_{sync}$) and horizontal sync ($H_{sync}$) signals, as well as active video time, occur coincidentally. It is further desired to generate a pixel clock for the motion video signal which tracks or is based on the original pixel clock of the computer video signal 212, and to use this generated pixel clock as the basis to create synchronization. This generated pixel clock may or may not be substantially identical to the pixel clock of the computer video signal 212, based on the "zoom factor", as discussed in more detail below. The video format analyzer and synchronizer (VFAS) 324 is used to effect these tasks.

A. Video Format Analyzer and Synchronizer

As seen with reference to FIGS. 3 and 5, portions of the computer video signal 212 (including vertical sync ($V_{sync}$), horizontal sync ($H_{sync}$), and the blue component of the computer video signal 212) are provided to the video format analyzer and synchronizer (VFAS) 324, which analyzes the computer video signal 212 to extract video timing information. Basically, the VFAS 324 duplicates the envelope of the computer video signal 212 from computer 210, so that the signals' envelopes are synchronized. In the illustrated embodiment, VFAS 324 includes a programmable frame controller (FC) 311, a video format analyzer (VFA) 318 and a wide-band phase locked loop (PLL) 319, although the frame controller 311, VFA 318 and PLL 319 may each constitute separate devices. A more detailed description of the operation of the VFAS 324 and its components is discussed below.

1. Programable Frame Controller (FC)

VFAS 324 includes a programmable frame controller 311. The FC 311 includes a series of programmable counters (not shown) and performs typical video frame controller tasks as are well known in the art, such as the generation of $H_{sync}$ and $V_{sync}$, and the generation of sequential frame buffer memory addresses for display purposes. Therefore, the operation of FC 311 will not be discussed in further detail except as it pertains to the present invention.

FC 311 is used in determining the timing parameters (that is, the video envelope) of the output RGB analog video signal 322 which will be provided to the monitor 220. All timing parameters are thus referenced to the clock signal of the FC 311. As the frequency of the synthesized pixel clock frequently exceeds the frequency capability of many common logic devices, the synthesized pixel clock is divided to a lower frequency signal. This signal is then used as the FC's clock. In one embodiment, the FC's clock is the synthesized pixel clock (generated by the PLL 319—discussed below) divided by four, which will hereinafter be referred to as the Group Clock (GCLK). According to one implementation, divider logic available in the video D/A converter 341 is used to divide the synthesized pixel clock. However, it is to be appreciated by those skilled in the art that any similar logic capable of scaling frequency may be used. Although division is shown in FIG. 5 as occurring outside of the video D/A converter, it is to be understood that it has been illustrated as such for simplicity and ease of understanding of the present invention, and not meant as a limitation.

FC 311 also generates "internal" $H_{sync}$ and $V_{sync}$ signals, which are used internally within the system. Specifically, the "internal" $V_{sync}$ signal is compared with the $V_{sync}$ of the computer video signal 212 to determine and maintain vertical phasing. The "internal" $V_{sync}$ signal is compared with the $V_{sync}$ of the computer video signal 212 by the VFA 318 to see if it is coincidental therewith. If it is, then it can be concluded that the "internal" $V_{sync}$ is synchronized with the $V_{sync}$ of the computer video signal 212 (except for possible vertical phasing adjustments, as discussed below). The "internal" $H_{sync}$ signal is used by the PLL 319 to synthesize or generate the original pixel clock from the $H_{sync}$ signal of the computer video signal 212 as described below.

In order to create the internal $H_{sync}$ signal, the FC 311 divides the GCLK by a programmable integer value called "$H_{total}$" and divides that quotient by a programmable value referred to as the "zoom factor" to create an internal $H_{sync}$ signal, where $H_{total}$ is the number of group clock periods which occur in a horizontal scan line. This internal $H_{sync}$ signal is provided to the feedback input of the PLL 319. The pixel clock, generated by PLL 319 discussed below, can thus be programmably altered by modifying the zoom factor. The FC 311 creates the internal $V_{sync}$ signal by dividing the internal horizontal frequency ($H_{sync}$) by $V_{total}$, the latter also being a programmable integer value equal to the total number of horizontal scan lines which occur in a single frame. It should be noted that these internal $H_{sync}$ and $V_{sync}$ signals are used for synchronization purposes and are separate and distinct from the $H_{sync}$ and $V_{sync}$ components, respectively, of the computer video signal 212. For ease and clarity of understanding, therefore, the $H_{sync}$ and $V_{sync}$ components of the computer video signal 212 will hereinafter be referred to as "external $H_{sync}$" and "external $V_{sync}$", respectively. Accurate determination of $H_{total}$ and $V_{total}$ are thus important in the synchronization of the motion video and computer video signals and will be discussed in more detail below.

2. Phase-Locked Loop (PLIS)

In addition to the FC 311, the VFAS 324 also includes PLL 319. While some components of the video envelope of the computer video signal 212 may be simply extracted, such as $H_{sync}$ and $V_{sync}$ the original pixel clock of the computer video signal 212 is not contained therein and is synthesized from the computer video signal 212. The purpose of the PLL 319 is to create (or generate) this pixel clock and to maintain synchronization of the FC 311 with the computer video signal 212.

According to one embodiment, this is accomplished through the application of the external $H_{sync}$ to the reference input of the PLL 319 and the internal $H_{sync}$ from the output of FC 311 to the feedback input of the PLL 319. It will thus be appreciated that PLL 319 attempts to maintain the feedback frequency (that is, the frequency of internal $H_{sync}$) at the same frequency as the reference frequency (that is, the frequency of external $H_{sync}$). In one implementation, the PLL 319 is preferably an ICS 1522 chip available from Integrated Circuit Systems, Inc. of Valley Forge, Pa.

Upon achieving a "synchronized" state, the PLL 319 output (the synthesized pixel clock) will operate at a frequency as determined according to the following equation:

$$f_{synthesized\ pixel\ clock} = 4 \times H_{total} \times f_{external\ Hsync} \times \text{Zoom Factor}$$

Given that the GCLK signal is ¼ the frequency of that of the synthesized pixel clock, its frequency may thus be described as follows:

$$f_{GCLK} = f_{synthesized\ pixel\ clock}/4 = H_{total} \times f_{external\ Hsync} \times \text{Zoom Factor}$$

Thus, it should be noted from the above equation that even though the external $H_{sync}$ frequency is unknown (and may indeed never be known), the PLL 319 can automatically recreate the original pixel clock of the computer video signal 212 once the correct $H_{total}$ value is selected. In other words, once the correct value for $H_{total}$ is determined, it is possible to correctly synchronize the external $H_{sync}$ with the internal $H_{sync}$. As stated above, the determination of the correct $H_{total}$ value is described below.

3. Video Format Analyzer (VFA)

Figure 6:
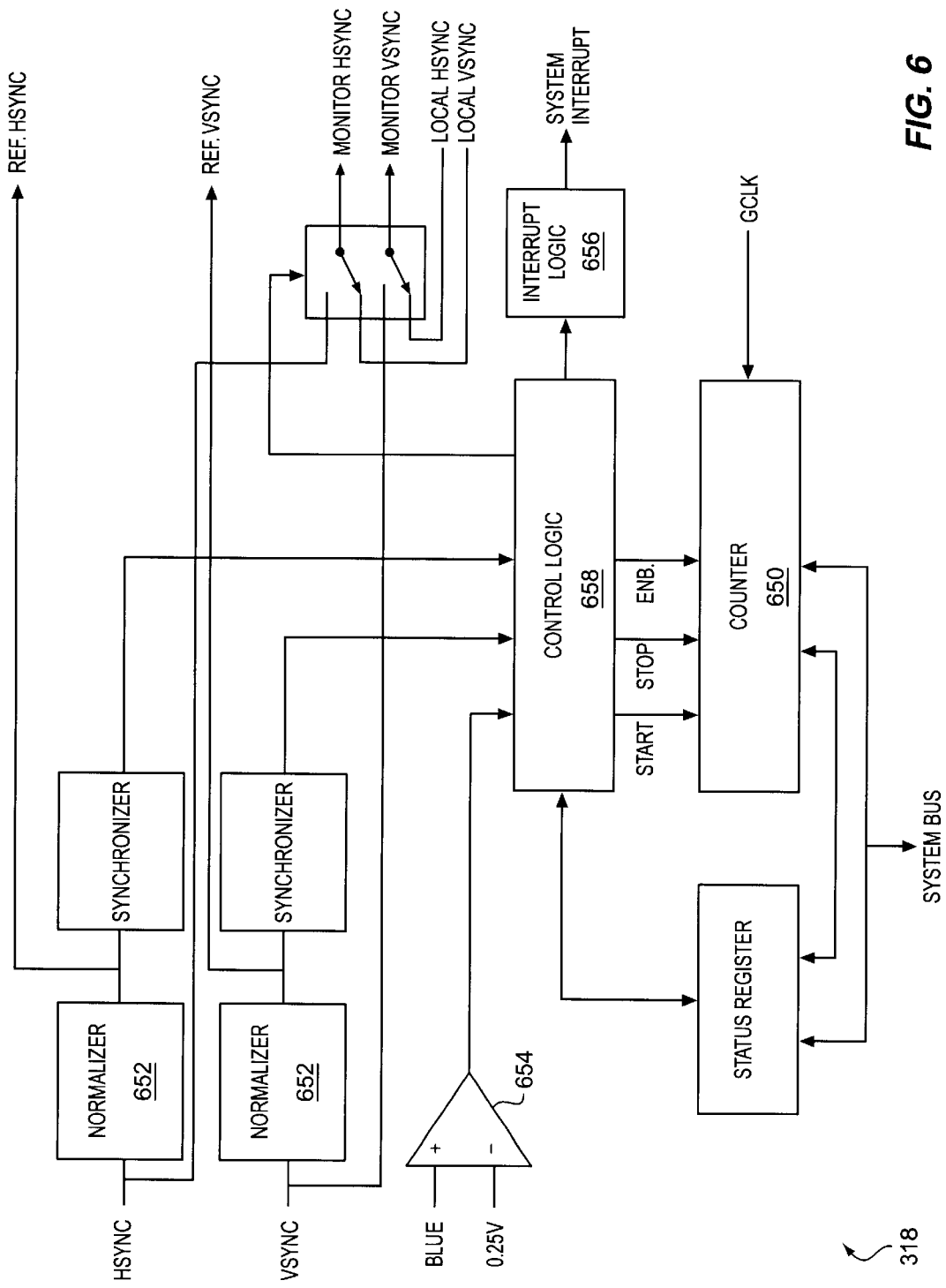
FIG. 6 illustrates a video format analyzer according to one embodiment of the present invention.

The VFAS 324 also includes a video format analyzer 318. According to one embodiment, the VFA 318 is a programmed array logic (PAL) containing a programmable counter, although it may constitute any similar logic device as known to those skilled in the art, such as an application-specific integrated circuit or a field programmable gate array. One embodiment of the VFA 318 is illustrated in FIG. 6.

A primary purpose of the VFA 318 is to analyze the computer video signal 212 to determine its video envelope characteristics. In most cases, this analysis is performed by measuring the time between "events" of interest. "Events" of interest involve the video timing parameters of the computer video signal 212, and include: the leading edge of external $H_{sync}$, the trailing edge of external $H_{sync}$, the leading edge of external $V_{sync}$, the trailing edge of external $V_{sync}$, the leading edge of internal $V_{sync}$, the start of active video (both horizontal and vertical), and the end of active video (both horizontal and vertical). The reference time base for measurement of these parameters is GCLK (for measurement of events less than or equal to a single horizontal scan line) or external $H_{sync}$ (for measurement of events longer than a single scan line). For example, $V_{total}$ (the number of horizontal scan lines in a frame) is determined by counting in counter 650, the number of "start of external $H_{sync}$" events that occur between two successive "start of external $V_{sync}$" events.

a. Sync Normalization by the VFA

In order for the VFA 318 to commence the various measurements of the external $H_{sync}$ pulse, it should "know" when such pulse is being asserted. The assertion of the external $H_{sync}$ pulse is determined by a "sync normalization" function in normalizer 652 which makes the determination based upon the duty cycle of the pulse. Sync normalization is performed because the polarity of the $H_{sync}$ and $V_{sync}$ of incoming computer video signal signals may vary depending on the host computer 210. For example, as phase-locked loops such as PLL 319 operate on the edge of signals, PLL 319 should be presented with an $H_{sync}$ pulse of positive polarity. As seen with reference to FIG. 6, the normalizer 652 accepts either polarity of $H_{sync}$ and $V_{sync}$ and respectively outputs an $H_{sync}$ and $V_{sync}$ pulse of positive polarity. The normalizer 652 may be implemented in a number of ways. One implementation includes a counter which counts up when a sync signal is positive and down when a sync signal is negative; therefore, at the end of the counting period, the sign bit of the counter corresponds to the sign of the sync pulse. This sign bit and the original sync pulse are then provided as inputs to an exclusive-or (XOR) gate, so that the output is a positive polarity signal. Alternatively, the sync signal may be latched whenever active video is present, and since a sync pulse is not asserted during active video, the latched value will correspond to the sync polarity. It will be appreciated that the manner by which the sync pulse is normalized is not limited to these embodiments, and other methods of sync nonnalization may be used instead.

b. Active Video Measurements by the VFA

Again, one of the events of interest which the VFA 318 measures is the start and end of active video time. In order to measure the active video region of the computer video signal 212, the VFA 318 measures the vertical front and back "porches" (respectively, $V_{front\ porch}$ and $V_{back\ porch}$), as well as the horizontal front and back porches (respectively, $H_{front\ porch}$ and $H_{back\ porch}$) of such signal. The VFA 318 measures $V_{front\ porch}$ and $V_{back\ porch}$ indirectly, by measuring the time from the leading edge of external $V_{sync}$ to the start of video ($V_{start}$) and the time from the leading edge of external $V_{sync}$ to the end of video ($V_{end}$) However, to ensure that the VFA 318 accurately measures $V_{start}$ and $V_{end}$, it is required that the computer video signal contain known video on both the first and last scan lines. This is accomplished by having a video conference control application or similar interface program in the computer 210 cause the video driver (not shown) of monitor 220 to display a border consisting of a number of pixels of a specified color at the boundary of the screen of monitor 220 for identifying the active video region of the computer video signal. The requirement for the computer 210 to generate known video content comes from the fact that the VFA 318 requires non-black video content at the borders to measure parameters such as front and back porch. However, in many situations sufficient video content will always exist—such as when rulming Windows 95™ with the default blue desktop. In other situations, an enhancement to VFA 318 could be implemented to accumulate video timing information over a period of time with the expectation that the computer 210 would eventually display video information at the display borders.

According to one embodiment of the present invention, the video conference control application commands the video driver to place a blue border of eight pixels around the screen of monitor 220, prior to the measurement of vertical resolution by VFA 318, although such border is not needed until the VFA 318 begins the measurement of the active video region discussed in this paragraph. The video conference control application then sends instructions to the VFA 318 to commence measurement of the active video time of the computer video signal 212 once the blue border is detected. According to one embodiment of the present invention, once measurement of the active video region has completed, the video conference control application sends a command over the bi-directional data and control path 215 to extinguish the blue border. The video conference control application controls the commencement and substantially controls the termination of this operation (the multiplexing system may send interrupt commands to terminate the operation in certain circumstances, otherwise the blue border will be extinguished automatically after a set time period). Alternatively, the video multiplexing system 213 of the present invention may instead control the commencement and termination of this operation. It should also be noted that although the "depth" of the border is eight pixels in one embodiment, such "depth" may instead constitute a different number of pixels and may constitute pixels of another color (e.g., green or red, or a combination of the green, red and blue colors) in alternate embodiments. Additionally, it is to be appreciated that instead of the automatic extinguishing of the blue border, if desired, the appearance of the blue border on the screen of monitor 220 may be eliminated through known video technique such as chroma-keying.

i. Vertical Measurement by the VFA

Once the blue border is established, the comparator 654 of FIG. 6 signals when video is present. In the illustrated embodiment, the threshold for detection of video by the comparator 654 is 0.25 volts, which is appropriate for most video systems which output video ranging from 0.0 to 0.7 volts. The start of active video (vertical) measurement is performed by counting in counter 650 the number of horizontal sync pulses that occur between the leading edge of external $V_{sync}$ and the horizontal scan line during which video is first detected. The end of active video (vertical) measurement is performed by counting the number of horizontal sync pulses which occur between the leading edge of external $V_{sync}$ and the scan line during which active video is last detected. In a similar method, the VFA 318 can measure the interval between events to determine vertical front porch, vertical back porch, and vertical active video—all measured in units of horizontal sync pulses (or horizontal scan lines), as known to those skilled in the art. In this way the vertical resolution of the source of the computer video signal 212 is accurately determined.

ii. Horizontal Measurements by the VFA

Horizontal measurements are made in a similar manner by the VFA 318, the difference being that GCLK is used as the unit of measurement. The start of horizontal active video measurement is performed by counting in counter 650 the number of GCLK pulses which occur between the leading edge of the external $H_{sync}$ pulse and the point when active video is first detected. The end of horizontal active video measurement is performed by counting the number of GCLK pules which occur between the leading edge of the external $H_{sync}$ pulse and the point when active video is last detected. In addition to the above measurements, the VFA 318 can measure the interval between events to determine horizontal front porch, horizontal back porch, horizontal active video—again all measured in units of GCLK, as known to those skilled in the art. All of these parameters will be used to determine horizontal resolution.

However, as previously discussed, GCLK is a function of not only the external $H_{sync}$ frequency but of the integer parameter $H_{total}$ and the zoom factor (in the FC 311), and therefore it is important that $H_{sync}$ be accurately determined and specified to the FC 311 before any horizontal measurements are made. In order to ensure the accuracy of $H_{total}$, and thus determined horizontal resolution, this value is not directly determined by measurement, but instead is determined by use of a lookup table in memory connected to controller 332. Determination of $H_{total}$ will now be discussed.

Measurement of $H_{total}$ and Video Synchronization by the Video Format Analyzer and Synchronizer (VFAS)

Figure 7:
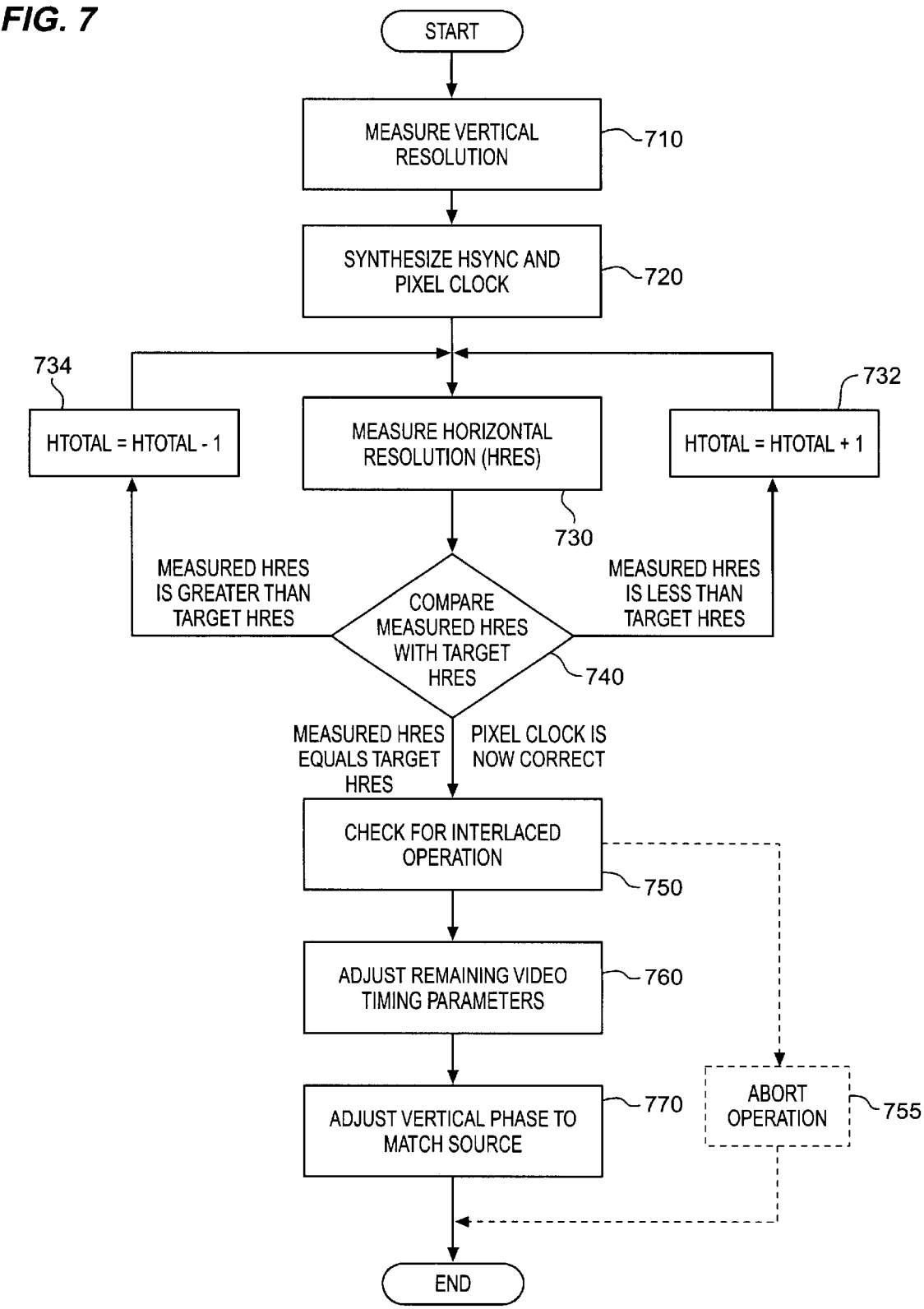
FIG. 7 is a flowchart illustrating the steps associated with establishing a video locked state between two signals according to one embodiment of the present invention.

FIG. 7 is a flowchart illustrating the steps associated with establishing video synchronization between the motion video signals and the computer video signal 212 according to one embodiment of the present invention. It is to be appreciated, however, that FIG. 7 illustrates only one embodiment, and that the order of the steps may be altered and/or steps removed.

First, the VFA 318 measures the vertical resolution of the computer, step 710. As discussed above, the video conference control application running on computer 210 causes the video driver in computer 210 to display a blue border on the screen of the monitor 220. Using this blue border, the VFA 318 measures the vertical active video which is the vertical resolution of the computer video signal 212.

After this measurement, the $H_{total}$ must be determined. Again, this value will be used to synthesize an internal $H_{sync}$ and the synthesized pixel clock. In step 720, the controller 332 uses the thus determined vertical resolution to look up the corresponding horizontal resolution according to Table I below which is stored in memory as discussed above, in order to determine $H_{total}$. In alternate embodiments, other methods for determining horizontal resolution are used rather than a lookup table, such as calculating the horizontal resolution using equations well known in the art based on the vertical resolution.

TABLE I

| Measured Vertical Resolution | Expected Horizontal Resolution |
|---|---|
| 480 to 599 | 640 |
| 600 to 767 | 800 |
| 768 to 863 | 1024 |
| 864 to 1023 | 1152 |
| 1024 to 1199 | 1280 |
| 1200 and above | 1600 |

A value for $H_{total}$ is then estimated by the following formula:

$$H_{total} \text{ (est.)} = 1.2 \times (\text{Expected Horizontal Resolution}/4)$$

Once the estimated $H_{total}$ has been calculated, the VFA 318 measures the horizontal resolution of the computer video signal 212 by again measuring the interval between events of interest, step 730. The measured resolution is then compared to the expected resolution by VFA 318, step 740, and if the measured resolution is less than the expected resolution, $H_{total}$ is incremented by one, step 732, and step 730 is repeated. This has the effect of increasing the frequency of the synthesized pixel clock. If the measured resolution is less than the expected resolution, $H_{total}$ is decremented by one, step 734, and step 730 is repeated. This has the effect of decreasing the frequency of the synthesized pixel clock. This process is repeated until the measured horizontal resolution is equal to the expected horizontal resolution. This ensures that the synthesized pixel clock has been correctly locked with the pixel clock of the video signal 212.

In the embodiment shown in FIG. 7, the computer video signal 212 is then further analyzed to determine if the display of monitor 220 is interlaced or non-interlaced (step 750). This is done in the VFA 318 by consecutive measurements of the time difference between the leading edge of $V_{sync}$ and the leading edge of $H_{sync}$. In non-interlaced video, this time difference will be constant. In interlaced video this difference varies by half a scan line for each successive $V_{sync}$. If interlaced video is detected, the condition is flagged and operation may be aborted, step 755, if desired, or the process may continue and the remaining video timing parameters may be next measured and adjusted, step 760.

Once determination is made as to whether the display is interlaced or not, the remaining video timing parameters are measured and adjusted accordingly in a manner similar to that discussed above, step 760. More specifically, the VFA 318 measures the remaining horizontal and vertical parameters and programs the FC 311 in accordance with these measurements. If desired, the video conference control application can be caused to extinguish the blue border.

At this point, the motion video is now synchronized with the computer video signal 212 in all ways except for an expected phase shift in vertical sync. Thus, the next step, step 770, is to adjust the vertical phase of the motion video signal in order to match the vertical phase of the computer video signal 212. The VFA 318 accomplishes this by counting in counter 650 the $H_{sync}$ pulses between the leading edge of the internal $_{sync}$ pulse and the leading edge of the $V_{sync}$ pulse of the computer video signal 212. This count represents the phase difference between the motion video signal and the computer video signal 212 in units of horizontal scan lines. This phase difference is corrected by increasing $V_{total}$ by the phase difference for a single frame. $V_{total}$ is then immediately restored. The two video signals should now be completely synchronized.

Another important feature of the VFA is that if vertical lock between the motion video and computer video signals is lost (that is, the internal $V_{sync}$ is not synchronized with the external $V_{sync}$), interrupt logic 656 of FIG. 6, under the control of control logic 658, will generate an interrupt. The VFA 318 can be programmed to prevent multiplexing of the motion video and computer video signals if synchronization is lost. In such a case, display of motion video on monitor 220 of computer 210 will be blanked until vertical lock is re-established. Likewise, multiplexing will occur only when vertical lock is re-established. Alternatively, if desired, VFA 318 can be programmed to multiplex the motion video and computer video signals irrespective of whether vertical lock is maintained. The latter is useful, for example, when trying to re-establish lock during video conferencing without losing the video conferencing channel altogether in the process, or if the display resolution is changed on the fly.

Horizontal Screen Resolution Modification

As discussed above, a separate frame buffer memory (VRAM 339 of FIG. 3) is used for the storage of video information for the motion video. In the illustrated embodiment, VRAM 339 is a 2 MB memory, with 1.5 MB being available for the display of motion video (the remaining 0.5 MB being used for the storage of various control information and received images). Having 1.5 MB available for the motion video display can result in storage space problems for large screen resolutions. The amount of memory required to store an image can be identified by the following equation:

$$\text{memory} = H_{resolution} \times V_{resolution} \times \text{color depth (in bytes)}$$

Thus, a 1024×768 screen resolution with 16 bits of color requires 1024×768×2 bytes, which is 1,572,864 bytes, or 1.5 MB. Similarly, a 1280×1024 screen resolution with 16 bits of color requires 1280×1024×2 bytes, which is 2,621,440 bytes, or 2.5 MB. Thus, a screen resolution of 1280×1024 cannot be conventionally supported by a 1.5 MB memory space.

The present invention resolves this problem by altering the width of the pixels (either enlarging the width or reducing the width) in the motion video, a process referred to as "zooming". By enlarging the pixel widths and correspondingly reducing the horizontal resolution, the present invention is able to reduce the amount of memory space necessary to store the image. Thus, by way of example, if the screen resolution is 1280×1024 with 16 bits of color, the present invention alters the widths of the pixels so that at most 768 pixels per scan line are displayed. The effective screen resolution then becomes 768 (or less)×1024, which requires no more than 768×1024×2 bytes, which is 1,572,864 bytes, or 1.5 MB.

According to one embodiment of the present invention, the pixels are modified only in the horizontal dimension. That is, the effective horizontal screen resolution may be modified, however the vertical screen resolution is not altered.

Figure 8:
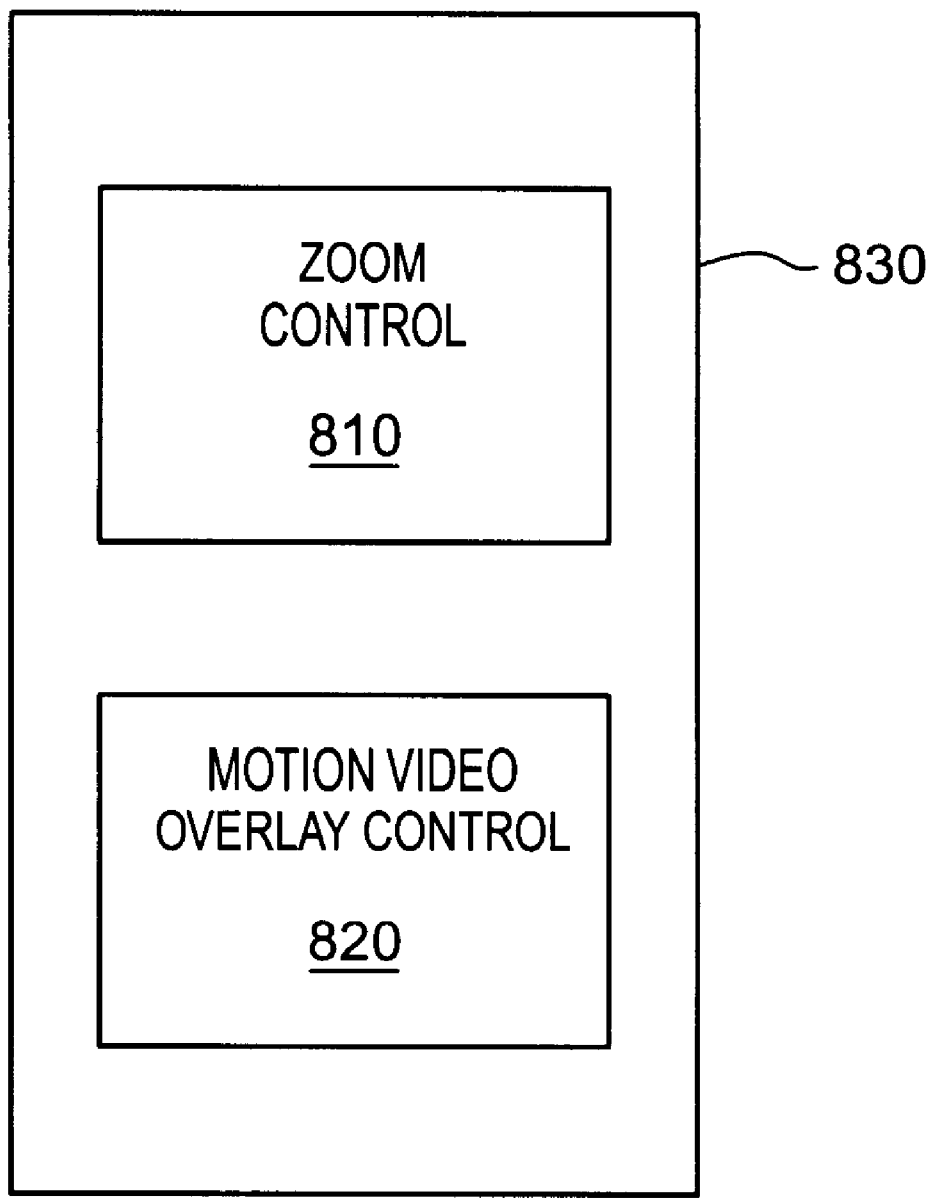
FIG. 8 illustrates a storage medium including one embodiment of the present invention.

According to one embodiment, the present invention is implemented in a combination of hardware and software. The hardware components of overlaying motion video on an analog signal are discussed above with reference to FIGS. 3–7. The software portion of the present invention is illustrated in FIG. 8, which illustrates a storage medium 830 including a zoom control portion 810 and a motion video overlay control portion 820. The motion video overlay control portion 820 controls the setting of various parameters of the hardware components, as discussed above. The zoom control portion 810 controls the identification of a correct zoom factor and the setting of the hardware components based on this zoom factor, as discussed in more detail below. The storage medium 830 is meant to represent a wide variety of machine-readable media in which the present invention can be implemented, including conventional storage devices (such as a floppy disk, random access memory, read only memory, Flash memory, etc.), as well as discrete hardware or firmware. In the illustrated embodiment, control portions 810 and 820 are implemented as a series of software routines executed by the video multiplexing system 213 of FIG. 2. These software routines comprise a plurality or series of instructions to be executed by system controller 332 of FIG. 3.

Figure 9:
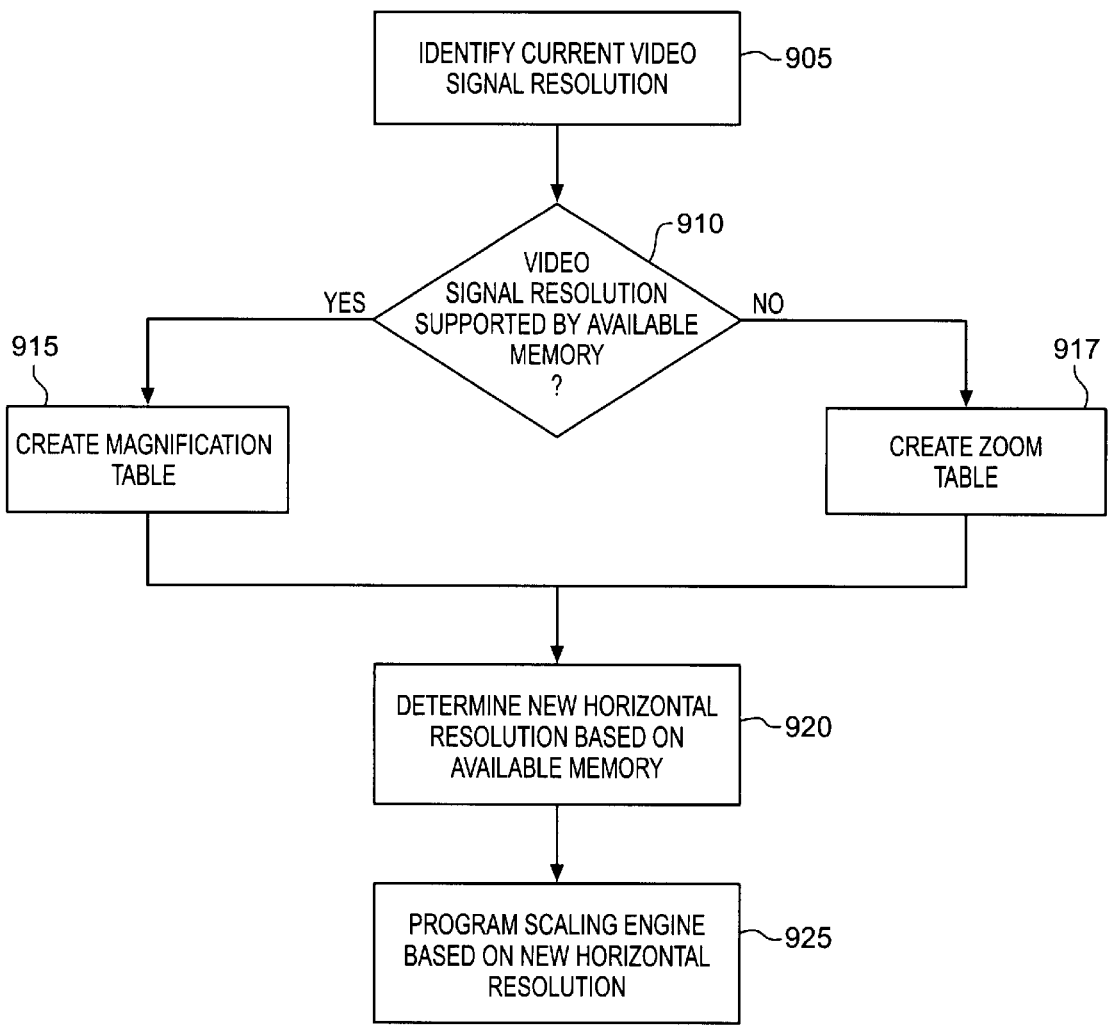
FIG. 9 is a flowchart illustrating the steps followed in modifying a horizontal screen resolution according to one embodiment of the present invention.

FIG. 9 is a flowchart illustrating the steps followed in modifying a horizontal screen resolution according to one embodiment of the present invention. As illustrated, the zoom control logic initially identifies the current video signal resolution, step 905. This video signal resolution is the resolution of the video signal 212 of FIG. 3. The zoom control logic then checks whether the identified video signal resolution is supported by the available memory (1.5 MB in the illustrated embodiment), step 910. If there is sufficient memory for the identified video signal resolution, then the zoom control logic creates a "magnification" table, step 915. The magnification table will be used to increase the horizontal screen resolution as discussed in more detail below. However, if there is insufficient memory for the identified video signal resolution, then the zoom control logic creates a "zoom" table, step 917. The zoom table will be used to decrease the horizontal screen resolution as discussed in more detail below. The zoom control logic then determines a new (modified) horizontal resolution, using either the magnification table from step 915 or the zoom table from step 917, based on the available memory, step 920, and programs the PLL 319 based on the new horizontal resolution, step 925. This programming of the PLL 319 alters the pixel width for the motion video to be different than that used for the display of images from the computer system 210.

Figure 10:
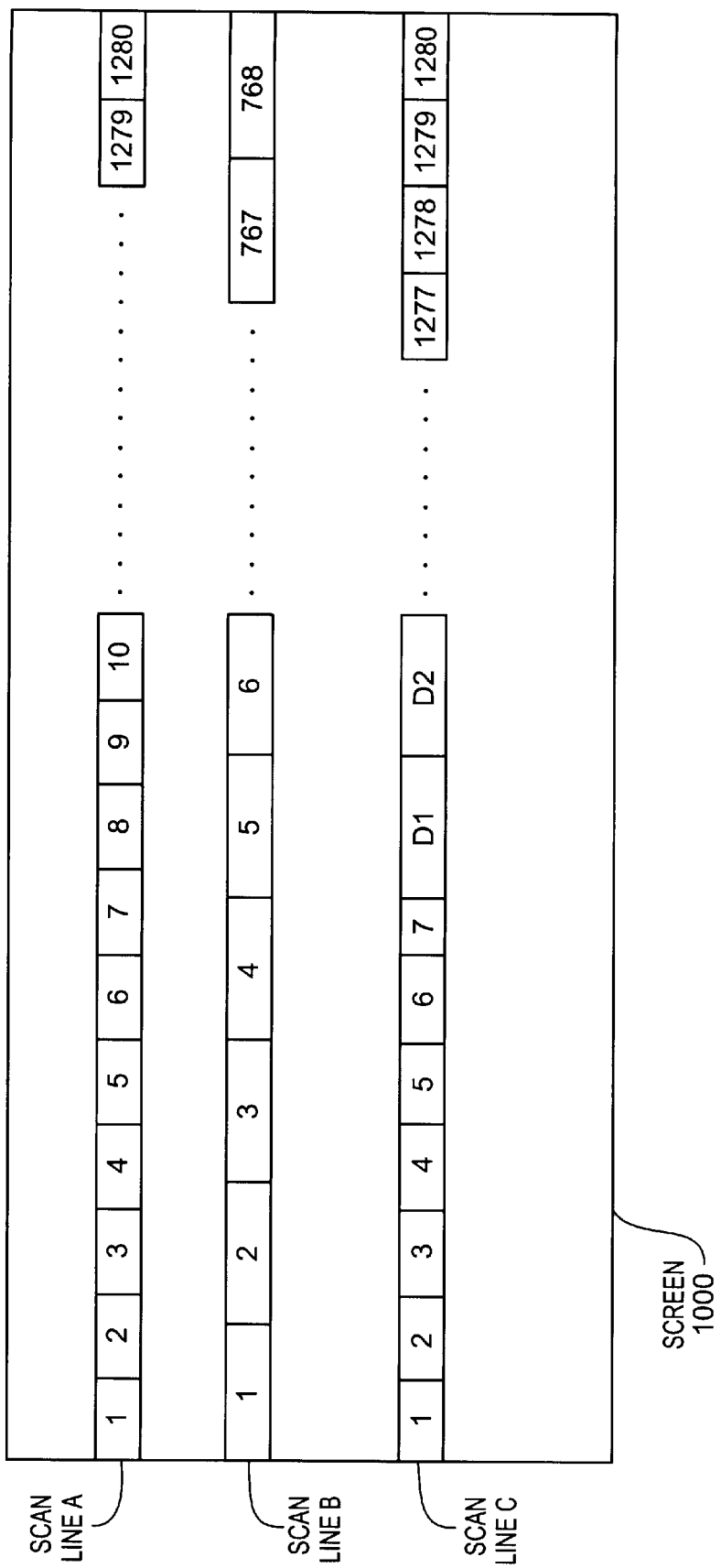
FIG. 10 illustrates multiple scan lines of a screen according to one embodiment of the present invention.
Figure 11:
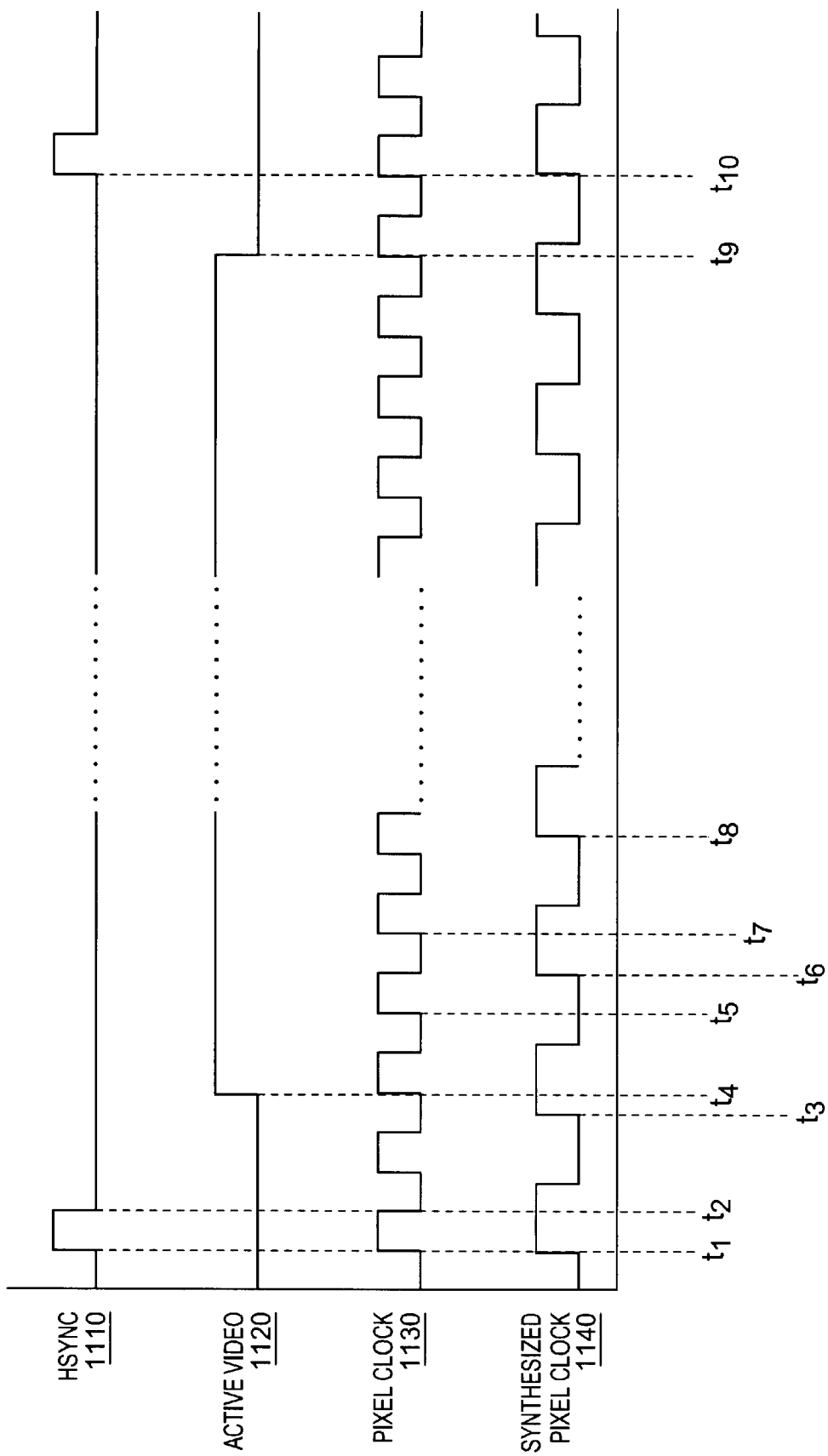
FIG. 11 is a timing diagram illustrating pixel clocks according to one embodiment of the present invention.

FIGS. 10 and 11 illustrate the pixel width modification according to one embodiment of the present invention. FIG. 10 illustrates a screen 1000 including an input scan line A having a horizontal resolution of 1280 pixels (e.g., from computer system 210), a concurrent scan line B having a horizontal resolution of 768 pixels (e.g., zoomed motion video), and a composite scan line C having two different horizontal resolutions (e.g., a combination of both the zoomed motion video and the video signal from computer system 210).

As illustrated, the pixels of the concurrent scan lines A, B, and C "line up" with each other at both the start of the line (the beginning of pixel 1 in each scan line) and at the end of the line (the end of pixel 1280 in scan lines A and C and pixel 768 in scan line B). However, each pixel in the scan line B is wider than the pixels in the scan line A. By widening the pixels in scan line B, fewer pixels are displayed per scan line, and thus memory requirements for the display of the scan line are reduced.

Additionally, the first four pixels and at least the last four pixels of scan line C (e.g., from the computer system 210) are the same size as those in scan line A, while several of the pixels in-between (e.g., from the local camera 222) are the same size as those in scan line B. Scan line C illustrates a composite scan line of PC video and motion video.

The pixel widths of a scan line are modified by altering the synthesized pixel clock, as illustrated in FIG. 11. An $H_{sync}$ signal 1110 is illustrated which indicates the beginning and ending of a horizontal scan line. The $H_{sync}$ signal 1110 is provided as part of the video signal 212 from the computer system 210. An active video line 1120 is illustrated which indicates when active video is being displayed, either images from the computer system 210 or the motion video. Video is being displayed when the active video line 1120 is "high" (that is, from time $t_4$ to time $t_9$). It should be noted that the active video line 1120 is included in FIG. 11 to assist in the explanation of the present invention; the active video line 1120 is not an actual signal input to or generated by the video multiplexing system of the present invention. The time between the end of $H_{sync}$, time $t_2$, and the start of the active video, time $t_4$, is referred to as the "back porch". Similarly, the time between the end of the active video, time $t_9$, and the start of the next $H_{sync}$ time $t_{10}$, is referred to as the "front porch".

The display of pixels is dependent on a pixel clock. A new pixel is displayed at each rising edge of the pixel clock. Thus, the number of pixel clock periods in the horizontal scan line corresponds to the number of pixels which are displayed on that scan line. A pixel clock 1130 is illustrated as well as a synthesized pixel clock 1140. The pixel clock 1130 is used for the display of pixels of images from video signal 212, while the synthesized pixel clock 1140, generated by PLL 319 of FIG. 3 discussed above, is used for the display of pixels of images from the motion video. As illustrated, a new pixel on the horizontal scan line is generated at times $t_4$, $t_5$, and $t_7$ for images from analog RGB signal 212, while a new pixel on the horizontal scan line is generated at times $t_3$, $t_6$, and $t_8$ for the motion video.

As discussed in more detail below, the video switch 314 of FIG. 3 outputs video information from one of either video signal 212 or RGB signals from D/A converter 341 (corresponding to the motion video). If the video information is output from video signal 212, then the pixels are displayed in accordance with pixel clock 1130, whereas if the video information is output from D/A converter 341, then the pixels are displayed in accordance with synthesized pixel clock 1140.

In the illustrated embodiment, the video switch 31 zl can switch its output between the two source signals, video signal 212, and the RGB signals from D/A converter 341 at the beginning of every GCLK. Thus, it is preferred that the rising edge of the synthesized pixel clock 1140 line up closely with the rising edge of the pixel clock 1130 at the point where a switch from one source to another occurs.

Figure 12:
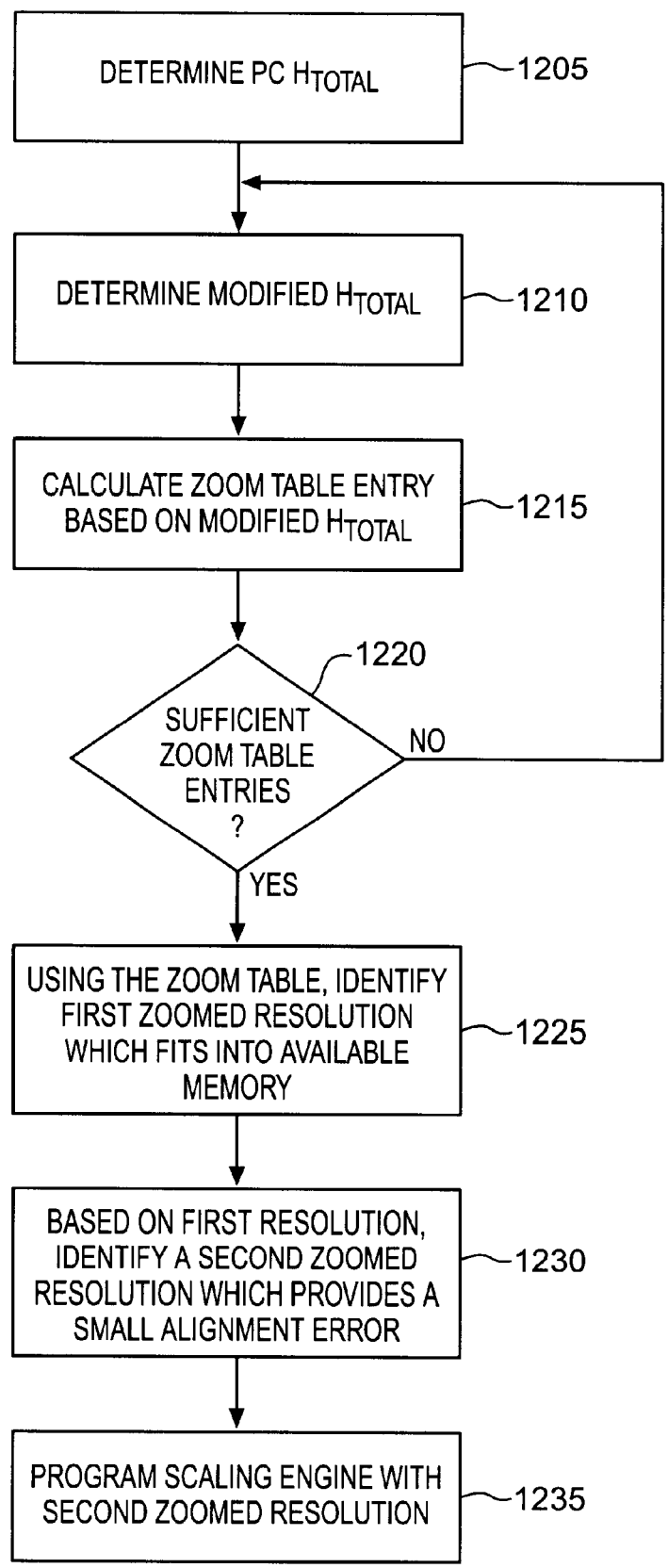
FIG. 12 is a flowchart illustrating the steps followed in identifying a proper horizontal resolution according to one embodiment of the present invention.

FIG. 12 is a flowchart illustrating the steps followed in identifying a proper horizontal resolution, based on available memory, according to one embodiment of the present invention. The proper value for $H_{total}$ from the computer system 210 (PC $H_{total}$) is first determined, step 1205, in accordance with the processes discussed above. The zoom control logic then determines a "modified" $H_{total}$ based upon pixels from the PC's point of view, step 1210. The modified $H_{total}$ value is initialized to be the same as $H_{total}$, and is subsequently decremented by four for each iteration through step 1210.

A zoom table entry is then calculated based on the modified $H_{total}$, step 1215. A zoom table entry includes at least four components: the modified $H_{total}$, the zoom factor, the zoomed horizontal resolution, and the alignment error. The modified $H_{total}$ is the value determined in step 1210. The zoom factor is calculated by dividing $H_{total}$ by the modified $H_{total}$. The zoomed horizontal resolution (Z_HRES) is calculated by dividing the PC horizontal resolution by the zoom factor. The alignment error is calculated according to the following equation:

error=zoom factor×(Z_HRES−(4.0×truncate ((Z_HRES/4.0)+0.5))))

The zoom control logic then checks whether a sufficient number of zoom table entries have been calculated, step 1220. According to one embodiment, the zoom control logic calculates 512 entries. However, alternate embodiments can generate a lesser or greater number of entries. Table II below illustrates a sample zoom table corresponding to a PC resolution of 1280×1024 and a PC $H_{total}$ of 1728. For ease of explanation, only a few entries have been included in Table II rather than 512.

TABLE II

| Zoomed Horizontal Resolution | Zoom Factor | Alignment Error | Modified $H_{total}$ | $H_{total}$ |
|---|---|---|---|---|
| 1280 | 1 | 0.0 | 1728 | 432 |
| 1277.037 | 1.00232 | 1.0 | 1724 | 431 |

TABLE II-continued

| Zoomed Horizontal Resolution | Zoom Factor | Alignment Error | Modified $H_{total}$ | $H_{total}$ |
|---|---|---|---|---|
| 1274.074 | 1.004651 | −1.9 | 1720 | 430 |
| . | . | . | . | . |
| . | . | . | . | . |
| . | . | . | . | . |
| 770.3704 | 1.661538 | −2.7 | 1040 | 260 |
| 767.4074 | 1.667954 | −1.0 | 1036 | 259 |
| 764.4444 | 1.674419 | 0.7 | 1032 | 258 |
| 761.4815 | 1.680934 | 2.5 | 1028 | 257 |
| 758.5185 | 1.6875 | −2.5 | 1024 | 256 |

Once the zoom table is created, the zoom control logic uses the zoom table to identify a first zoomed resolution which fits into available memory, step 1225. This first zoomed resolution is the largest zoomed horizontal resolution that can be used with the available memory. In the illustrated embodiment, with 16 bits of color (2 bytes), the first zoomed horizontal resolution (Z_HRES) is determined using the following calculation:

Available Memory≧Z_HRES×Vertical Resolution×2

When the largest value of zoomed horizontal resolution (Z_HRES) in the table which satisfies the above calculation is identified, the zoom control logic evaluates a number of subsequent entries in the table, with lower zoomed horizontal resolutions, to identify a second zoomed resolution which provides a small alignment error, step 1230. This alignment error indicates the alignment difference of visible pixels between is internally generated video (from VRAM 339) and external generated video (from computer system 210). The zoom control logic searches for an alignment error within a predetermined range, (e.g., between −0.3 and 0.3). In the illustrated embodiment, the zoom control logic only looks at a few zoomed horizontal resolutions because each subsequent entry represents a loss of resolution. In the illustrated embodiment, the zoom control logic looks at a number of subsequent table entries, referred to as the "search range", identified by the following calculation:

search length=alignment error at first Z_HRES×4

The zoom control logic uses the largest zoomed horizontal resolution within the search range with an alignment error within the predetermined range as the second zoomed resolution. If no alignment error is within the predetermined range, then the zoom control uses the zoomed horizontal resolution within the search range with the smallest alignment error as the second zoomed resolution. It is to be appreciated that the second zoomed horizontal resolution in step 1230 may be the same as the first zoomed horizontal resolution in step 1225.

Generation of a magnification table (step 915 of FIG. 9) rather than a zoom table is done in an analogous manner, except that the magnification table entries are calculated by incrementing the modified $H_{total}$ value by four for each iteration through step 1210. Thus, zoom factors in the magnification table have a value between 0 and 1.0. The zoom control logic selects a first and a second zoomed horizontal resolution from the magnification table in the same maimer as it selects a first and second zoomed horizontal resolution from the zoom table.

The zoom control logic then programs the frame controller 311 with this second zoomed horizontal resolution (from either the magnification table or the zoom table), step 1235.

According to one implementation, frame controller 311 is programmed with integer values, so the second zoomed horizontal resolution is thus rounded to the closest integer value. Thus, the frame controller will display the motion video with a horizontal resolution equal to this second zoomed horizontal resolution identified in step 1230.

Thus, by way of example, referring to Table II with a color depth of 16 bits, the first zoomed horizontal resolution which fits into the available 1.5 MB of memory is 767.4074. The zoom control logic then searches the next 4 entries and identifies the zoomed horizontal resolutions of 764.4444, which has an alignment error of 0.7, as the second zoomed resolution. The value of 764.4444 rounds to an integer value of 764, so 764 is thus programmed into the frame controller 311.

According to one embodiment of the present invention, the motion video which is overlaid onto the video signal 212 is received as a Common Imaging Format (CIF) image. The CIF standard uses an image dimension of 352×288, which is a common image resolution for current video conferencing applications. In a conventional video system, a scaling engine, such as co-processor 337 of FIG. 3 described above, is used to scale a lower resolution image to a higher resolution image. Such scaling typically involves the use of interpolation, in which the scaling engine calculates additional pixel values for images based on the original image's pixel values. By way of example, a 352×288 resolution image can be scaled to a 1280×1024 resolution image by calculating 928 new pixel values for each horizontal line and 738 new pixel values for each vertical column. Such scaling techniques are well known to those skilled in the art and thus will not be discussed further except as they pertain to the present invention.

Thus, it is to be appreciated that the use of the present invention in a traditional video conferencing system does not affect the image quality of the motion video, despite the fact that the zoomed horizontal resolution of the CIF images may in fact be less than the resolution of the video signal 212. At full screen size, the zoomed horizontal resolution (e.g., 768×1024), although less than the video signal 212 resolution (e.g., 1280×1024) is still greater than the original image (e.g., 352×288), so no image quality has been lost.

In the discussions above, the identification of the zoomed horizontal resolution to be used by the present invention is performed by generating a zoom or magnification table. However, it is to be appreciated that alternate embodiments need not generate such tables—by way of example, other calculations may be used, or the table entries for selected common resolutions may be pre-coded into a table (thereby eliminating an "on the fly" calculation). It is also to be appreciated that alternate embodiments can combine the zoom and magnification table into a single table rather than two separate tables.

When zoom factors ranging between 0.0 and 1.0 are used, the synthesized pixel clock 1140 of FIG. 11 above has a shorter clock period than that of pixel clock 1130. By way of example, the image resolution of video signal 212 may be 640×480. Using a 640×480 screen resolution for the motion video only requires 614,400 bytes (assuming 2 bytes of color per pixel), or approximately 0.6 MB. Thus, an additional approximately 0.9 MB of the VRAM 339 is available for display. Thus, the original screen resolution of 640×480 can be magnified to 1638×480 with a zoom factor of 0.39.

Such an increase in screen magnification can increase the image quality of the motion video. For example, if a 352×288 image were to be displayed in a window one-quarter the size of a screen with a resolution of 640×480, then a window area with dimensions of 320×240 would be available for the image. However, since the image has a dimension of 352×288, then 32 pixels in the horizontal dimension and 48 pixels in the vertical dimension are "lost" by the scaling of co-processor 337. In other words, the scaling of co-processor 337 modifies the image to eliminate 32 pixels in the horizontal dimension and 48 pixels in the vertical dimension. However, "magnifying" the motion video according to the present invention with a screen resolution of 1638×480, that same image being displayed on one-quarter of a screen would have a dimension of 819×240. Thus, although 48 pixels are still lost in the vertical dimension, no pixels are lost ill the horizontal dimension. Therefore, the quality of the image has been improved due to the co-processor 337 having to remove fewer pixels.

Thus, particularly when used with a traditional video conferencing system, the present invention advantageously reduces the memory requirements for high screen resolutions without sacrificing image quality, and at the same time can increase image quality for lower screen resolutions.

It should also be noted that although the above discussions describe the horizontal resolution modification as being preformed for an overlapping motion video, the present invention is not limited to such embodiments. In alternate embodiments, the present invention is implemented on "full screen" motion video.

Smart Video Switch and Multiplexer Control Mask

Once the motion video is processed appropriately, the aforementioned horizontal and vertical parameters of the display of the computer 210 determined, the zoom factor determined, and the motion video and computer video signal 212 synchronized, the video multiplexing system 213 determines whether the computer video signal 212 or the motion signal is to be displayed on the monitor 220.

Referring again to FIG. 3, the smart video switch 314 is an analog switch used to source either the computer video signal 212 or the motion video output from the D/A converter 341 to the screen of computer monitor 220 through video amplifier 316. In operation, the smart video switch 314 combines, or multiplexes, the computer video signal with the motion video output from the video D/A converter 341, and then, based upon information generated by a multiplexer control mask (MCM) 334, selects the correct image source (computer 210 or motion video source) for display on the screen of monitor 220. According to one implementation, MCM 334 is a 16 k byte static random access memory (SRAM), while the smart video switch 314 is a QS4A205 high speed analog multiplexer available from Quality Semiconductor, Inc. of Santa Clara, Calif. However, alternate embodiments can use similar commercially available memories and/or multiplexers.

In the present invention, the smart video switch 314 is capable of switching between images on a boundary of every four pixels, but may alternatively be made to switch on smaller boundaries (e.g., every two pixels or every pixel). While switching on smaller boundaries would increase the resolution of the border between the computer video signal 212 from the host computer 210 and the video image to be displayed, it would also increase memory requirements of the MCM 334, and thus such increase in switch 314 switching speed depends on the amount of memory available to the MCM 334.

As each raster line of the combined video, motion video and computer video signal, is formed the system of the present invention determines which image source is to be displayed—the computer video signal 212 or the motion video signal output from video D/A converter 341. This decision is controlled by the MCM 334. Under the control of controller 332, the MCM 334 controls the smart video switch 314 to output one of either the computer video signal 212 from the computer 210 or motion video signal output from the video D/A converter 341. The "mask" serves as a template for drawing a background "window" into which the motion video signal from the local video source or remote video source will ultimately be displayed. Thus, the MCM 334 is used to determine the display size and location of the window(s) which will display the video signal received from the remote and/or local video signal sources.

More particularly, each bit in the MCM 334 controls the source of video for a pixel or multiple pixel block (e.g., a single bit in the MCM 334 controls a 4×4 pixel array in one implementation). The MCM 334 generates a continuous bit stream of pixel data having values of "0" or "1". Such values represent whether the switch 314 will source the computer video signal 212 from the computer 210 or whether it will source the motion video signal output from video D/A convert 341. According to one embodiment, a bit value of "0" will cause the smart video switch 314 to source the computer video signal 212 for four horizontally adjacent pixels of the screen, while a bit value of "1" will cause the smart video switch 314 to source the motion video signal output from the video D/A converter 341 for the four pixels for four scan lines. Again, resolution can be increased, if desired (e.g., in an alternate implementation a single bit in MCM 334 controls the source of video for a single pixel). The "windows" created by MCM 334 are much like other computer "windows" known in the art. Again, local video from the local video source 222 is ultimately displayed in one "window" (e.g., window 104 of FIG. 1), while video from the remote video source is ultimately displayed in another window (e.g., window 102 of FIG. 1). Information generated by the computer video signal 212 is displayed in another area, such as window 106 of FIG. 1. Additional "windows" may be displayed by the MCM 334. According to one embodiment, these windows are used to display graphics information from an application such as user interface program and which is used for controlling the system of the present invention. It is to be appreciated that the MCM 334 may be programmed to display windows in rectangles or various other shapes. For example, if the granularity of the MCM is made to be very fine (e.g., a resolution of one or two pixels), it is possible to create a window which has an arbitrary shape. Thus, an outline view of the speaker could in fact be the "window".

The content of the memory of MCM 334 may be controlled by the video conference control application or similar user interface program running in the computer 210. In the video conferencing embodiment, this application would control the size, position and stacking order of the near- and far-side windows. The user controls these factors in the same manner he or she would for any computer window. For example, if the user resizes or moves a window containing the near- or far-side motion video, this information is transmitted from the computer system 210 to the multiplexer system of the present invention through controller 332 and bus arbitration and control logic 345, the system controller 332 adjusting the contents of the MCM 334 memory accordingly.

Although the multiplexing system of the present invention has been discussed in reference to a video conferencing environment, it will be appreciated that such multiplexing system has a broader range of uses, and may be used in several applications, such as a communications broadcast environment, a multimedia environment, a DVD-recorder and/or playback application, other computer and video applications, etc. Additionally, such multiplexing system may be used in a video test instrument or in a video format converter. Furthermore, although the source of the computer video signal 212 is described above as a computer outputting VGA-style RGB video with separate $H_{sync}$ and $V_{sync}$ pulses, the present invention is not so limited, and may be extended to all versions of RGB video, including video with composite $H_{sync}$ and $V_{sync}$ video with sync on green, as well as RS 170 compliant video and its derivatives. In addition, although control of the motion video frame controller 311 is effected using software commands, it may alternatively be effected using a hardware implementation.

According to an alternate embodiment of the present invention, multiplexing system 213 provides memory management based on window sizes and positions. In this alternate embodiment, rather than having the entire screen which is zoomed by the present invention, a region (e.g., a single rectangular region) of the display is defined which encompasses all of the windows containing motion video. The resolution of this region is used to compute the proper zoom factor rather than the resolution of the entire screen. This region is then considered to be the motion video and is zoomed as discussed above. According to one implementation this region is dynamically defined and is modified each time a window within the region is closed or re-sized, or a new window on the display device is opened (e.g., either a newly created window or a previously minimized window being re-stored to its previous size).

Figure 13:
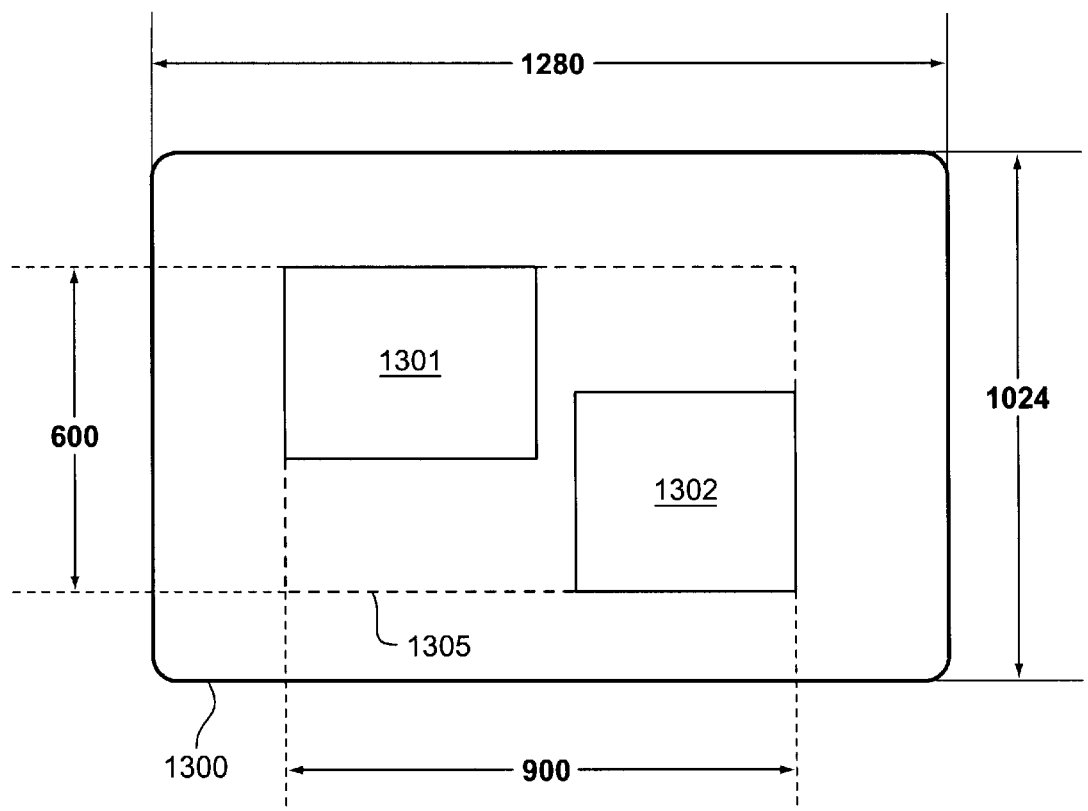
FIG. 13 illustrates a display according to an alternate embodiment of the present invention.

FIG. 13 illustrates a display according to One such alternate embodiment. The display 1300 includes two windows 1301 and 1302. A region 1305 is defined by the zoom control logic which includes both of the windows 1301 and 1302. As illustrated, although the computer system is using a screen resolution of 1280×1024, only a 900×600 region includes windows being displayed. Thus, the zoom control logic calculates a zoom factor based on a computer screen resolution of 900×600 rather than 1280×1024. Thus, a zoom factor of less than 1 could be used even though the computer resolution suggests a zoom factor greater than 1 due to the implied requirement of 2.5 MB (1280×1024×2 bytes).

Furthermore, although the multiplexing system of the present invention has been discussed in reference to receiving motion video from a camera, any of a wide variety of devices can be the source of such motion video. Examples of such sources include a video cassette player, laser disk player, television, digital versatile disk (DVD) player, etc.

In addition, although the multiplexing system of the present invention has been discussed in reference to receiving a motion video signal, the present invention is not limited to such embodiments. In alternate embodiments other types of signals are received, such as "static" or "still" images (e.g., one or more frames of the same image), from any of a wide variety of conventional sources. By way of example, VRAM 339 of FIG. 3 may repeatedly provide the same data to D/A converter 341 for multiple frames of computer video signal 212. By way of another example, the same image may repeatedly be input to VRAM 339. It is to be appreciated that the zooming of the present invention is not dependent on the source of the video signal or the video content (e.g., motion video or otherwise).

Additionally, although the zooming of the present invention has been discussed in reference to a video multiplexing system, the present invention is not limited to such embodiments. In alternate embodiments, the zoomed motion video encompasses the entire display of monitor 220 rather than being an overlay. Thus, it is to be appreciated that in such alternate embodiments much of the hardware of multiplexing system 213 for synchronizing the motion video to the computer video signal is not necessary, as there are not two different signals to be synchronized.

Furthermore, in the discussions above, the multiplexing system 213 is described as being separate from the computer system 210. It is to be appreciated that, in alternate embodiments, multiplexing system 213 can be incorporated into computer system 210.

Thus, a method and apparatus for modifying screen resolution based on available memory has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising the steps of:
   identifying a first screen resolution for a display, the first screen resolution corresponding to a resolution setting for the display;
   receiving a video signal to be displayed on the display having a video signal resolution; and
   creating a second screen resolution for displaying the received video signal on the display based on the video signal resolution, the first screen resolution and a comparison of the second screen resolution to the amount of memory available in a frame buffer for the display, to create the largest second screen resolution that can be used with the memory available.

2. The method of claim 1, wherein the step of creating comprises the step of altering a pixel width for each of a plurality of pixels of the received video signal.

3. The method of claim 2, wherein the step of creating further comprises the steps of:
   identifying a plurality of screen resolutions which can be used as the second screen resolution; and
   selecting as the second screen resolution the one of the plurality of screen resolutions which provides a smallest alignment error with the first screen resolution.

4. The method of claim 2, wherein the step of altering a pixel width comprises the step of altering a pixel clock period corresponding to the second screen resolution.

5. The method of claim 4, wherein the step of altering the pixel clock period comprises the step of increasing the pixel clock period.

6. The method of claim 2, wherein the plurality of pixels comprises every pixel to be displayed as part of the image.

7. The method of claim 1, wherein displaying the received video signal on the display comprises displaying the received video signal on the entire display.

8. The method of claim 1, further comprising the step of overlaying an image having the second screen resolution on an image having the first screen resolution.

9. The method of claim 1, wherein the received video signal includes one or more windows which provide video information from one or more video conferencing cameras.

10. The method of claim 1, wherein a horizontal resolution of the second screen resolution is less than a horizontal resolution of the first screen resolution.

11. The method of claim 1, wherein a horizontal resolution of the second screen resolution is greater than a horizontal resolution of the first screen resolution.

12. The method of claim 1, wherein the step of creating the second screen resolution further comprises generating a first candidate resolution and a second candidate resolution, comparing each candidate resolution to the available frame buffer memory, selecting a candidate resolution based on the comparison.

13. The method of claim 12, wherein the step of creating the second screen resolution further comprises generating further candidate resolutions by incrementing the resolution by a selected amount.

14. The method of claim 12, wherein the step of selecting a candidate further comprises selecting the largest resolution that will fit into the available frame buffer memory.

15. The method of claim 1, wherein the step of creating the second screen resolution further comprises generating a first candidate resolution and a second candidate resolution, determining the alignment error between each candidate resolution and the first resolution, comparing each candidate resolution to the available frame buffer memory, and selecting a candidate resolution with the largest resolution that will fit into the available frame buffer memory from among those candidate resolutions that have an alignment error less than a desired threshold.

16. A machine-readable medium having stored thereon a plurality of instructions, designed to be executed by a processor, for implementing a function for identifying a first screen resolution for a display, the first screen resolution corresponding to a resolution setting for the display, for receiving a video signal to be displayed on the display having a video signal resolution, and for creating a second screen resolution for displaying the received video signal on the display based on the video signal resolution, the first screen resolution and a comparison of the second screen resolution to the amount of memory available in a frame buffer for the display, to create the largest second screen resolution that can be used with the memory available.

17. The machine-readable medium of claim 16, wherein the plurality of instructions for implementing a function for creating comprises a plurality of instructions for implementing a function for altering a pixel width for each of a plurality of pixels of the received video signal.

18. The machine-readable medium of claim 17, wherein the plurality of instructions for implementing a function for creating are further for implementing a function for identifying a plurality of screen resolutions which can be used as the second screen resolution, and for selecting as the second screen resolution the one of the plurality of screen resolutions which provides a smallest alignment error with the first screen resolution.

19. The machine-readable medium of claim 17, wherein the plurality of instructions for implementing a function for altering a pixel width comprises a plurality of instructions for implementing a function for altering a pixel clock period corresponding to the second screen resolution.

20. The machine-readable medium of claim 19, wherein the plurality of instructions for implementing a function for altering the pixel clock period comprises plurality of instructions for implementing a function for increasing the pixel clock period.

21. The machine-readable medium of claim 17, wherein the plurality of pixels comprises every pixel to be displayed as part of the image.

22. The machine-readable medium of claim 16, wherein displaying the received video signal on the display comprises displaying the received video signal on the entire display.

23. The machine-readable medium of claim 16, wherein the plurality of instructions are further for implementing a function for overlaying an image having the second screen resolution on an image having the first screen resolution.

24. The machine-readable medium of claim 16, wherein the received video signal includes one or more windows which provide video information from one or more video conferencing cameras.

25. The machine-readable medium of claim 16, wherein a horizontal resolution of the second screen resolution is less than a horizontal resolution of the first screen resolution.

26. The machine-readable medium of claim 16, wherein a horizontal resolution of the second screen resolution is greater than a horizontal resolution of the first screen resolution.

27. The machine-readable medium of claim 16, wherein the plurality of instructions for implementing a function for creating comprises a plurality of instructions for implementing a function for generating a first candidate resolution and a second candidate resolution, comparing each candidate resolution to the available frame buffer memory, selecting a candidate resolution based on the comparison.

28. The machine-readable medium of claim 27, wherein the plurality of instructions for implementing a function for creating comprises a plurality of instructions for implementing a function for generating further candidate resolutions by incrementing the resolution by a selected amount.

29. The machine-readable medium of claim 27, wherein the plurality of instructions for implementing a function for selecting a candidate comprises a plurality of instructions for implementing a function for selecting the largest resolution that will fit into the available frame buffer memory.

30. The machine-readable medium of claim 16, wherein the plurality of instructions for implementing a function for creating comprises a plurality of instructions for implementing a function for generating a first candidate resolution and a second candidate resolution, determining the alignment error between each candidate resolution and the first resolution, comparing each candidate resolution to the available frame buffer memory, and selecting a candidate resolution with the largest resolution that will fit into the available frame buffer memory from among those candidate resolutions that have an alignment error less than a desired threshold.

31. An apparatus comprising:
   a video format analyzer and synchronizer for identifying a first screen resolution for a display, the first screen resolution corresponding to a resolution setting for the display and for receiving a video signal to be displayed on the display having a video signal resolution; and
   a zoom control logic, coupled to the video foimat analyzer and synchronizer, for creating a second screen resolution for displaying the received video signal on at least a portion of the display based on the video signal resolution, the first screen resolution and a comparison of the second screen resolution to the amount of memory available in a frame buffer for the display, to create the largest second screen resolution that can be used with the memory available.

32. The apparatus of claim 31, wherein the apparatus comprises a video multiplexing system.

33. The apparatus of claim 31, wherein the zoom control logic is also for altering a pixel width for each of a plurality of pixels of the received video signal.

34. The apparatus of claim 33, wherein the zoom control logic is also for identifying a plurality of screen resolutions which can be used as the second screen resolution, and for selecting as the second screen resolution the one of the plurality of screen resolutions which provides a smallest alignment error with the first screen resolution.

35. The apparatus of claim 33, wherein the zoom control logic is also for altering a pixel clock period corresponding to the second screen resolution.

36. The apparatus of claim 33, wherein the zoom control logic is also for increasing the pixel clock period.

37. The apparatus of claim 33, wherein the plurality of pixels comprises every pixel to be displayed as part of the image.

38. The apparatus of claim 31, wherein the received video signal is displayed on the entire display.

39. The apparatus of claim 31, further comprising a video switch, coupled to both the zoom control logic and the video format analyzer and synchronizer, for overlaying an image having the second screen resolution on an image having the first screen resolution.

40. The apparatus of claim 31, wherein the received video signal includes one or more windows which provide video information from one or more video conferencing cameras.

41. The apparatus of claim 31, wherein a horizontal resolution of the second screen resolution is less than a horizontal resolution of the first screen resolution.

42. The apparatus of claim 31, wherein a horizontal resolution of the second screen resolution is greater than a horizontal resolution of the first screen resolution.

43. The apparatus of claim 31, wherein the zoom control logic is also for generating a first candidate resolution and a second candidate resolution, comparing each candidate resolution to the available frame buffer memory, and selecting a candidate resolution based on the comparison.

44. The apparatus of claim 43, wherein the zoom control logic is also for generating further candidate resolutions by incrementing the resolution by a selected amount.

45. The apparatus of claim 43, wherein the zoom control logic is also for selecting the largest resolution that will fit into the available frame buffer memory.

46. The apparatus of claim 31, wherein the zoom control logic is also for generating a first candidate resolution and a second candidate resolution, determining the alignment error between each candidate resolution and the first resolution, comparing each candidate resolution to the available frame buffer memory, and selecting a candidate resolution with the largest resolution that will fit into the available frame buffer memory from among those candidate resolutions that have an alignment error less than a desired threshold.

47. An apparatus comprising:
   means for identifying a first screen resolution for a display;
   means for receiving a video signal to be displayed on the display having a video signal resolution; and
   means, coupled to the means for idenitifying, a first screen resolution, for creating a second screen resolution for displaying the received video signal on the display based on the video signal resolution, the first screen resolution and a comparison of the second screen resolution to the amount of memory available in a frame buffer for the display, to create the largest second screen resolution that can be used with the memory available.

48. The apparatus of claim 47, wherein the means for creating is also for altering a pixel width for each of a plurality of pixels of the received video signal.

49. The apparatus of claim 48, wherein the means for creating is also for identifying a plurality of screen resolutions which can be used as the second screen resolution, and for selecting as the second screen resolution the one of the plurality of screen resolutions which provides a smallest alignment error with the first screen resolution.

50. The apparatus of claim 48, wherein the means for creating is also for altering a pixel clock period corresponding to the second screen resolution.

51. The apparatus of claim 50, wherein the means for creating is also for increasing the pixel clock period.

52. The apparatus of claim 47, further comprising means, coupled to both the means for identifying and the means for creating, for overlaying an image having the second screen resolution on an image having the first screen resolution.

* * * * *